(12) United States Patent
Shinohara et al.

(10) Patent No.: US 10,393,608 B2
(45) Date of Patent: Aug. 27, 2019

(54) PRESSURE CHANGE MEASURING APPARATUS AND PRESSURE CHANGE MEASURING METHOD

(71) Applicant: SEIKO INSTRUMENTS INC., Chiba-shi, Chiba (JP)

(72) Inventors: Yoko Shinohara, Chiba (CN); Takeshi Uchiyama, Chiba (CN); Manabu Oumi, Chiba (CN); Masayuki Suda, Chiba (CN)

(73) Assignee: SEIKO INSTRUMENTS INC. (JP)

( * ) Notice: Subject to any disclaimer, the term of this patent is extended or adjusted under 35 U.S.C. 154(b) by 85 days.

(21) Appl. No.: 15/316,607

(22) PCT Filed: Jun. 25, 2014

(86) PCT No.: PCT/JP2014/066791
§ 371 (c)(1),
(2) Date: Dec. 6, 2016

(87) PCT Pub. No.: WO2015/198414
PCT Pub. Date: Dec. 30, 2015

(65) Prior Publication Data
US 2017/0160162 A1   Jun. 8, 2017

(51) Int. Cl.
*G01L 23/10* (2006.01)
*G01L 9/00* (2006.01)
(52) U.S. Cl.
CPC ............ *G01L 23/10* (2013.01); *G01L 9/0002* (2013.01); *G01L 9/0052* (2013.01)
(58) Field of Classification Search
USPC ......................................................... 702/47
See application file for complete search history.

(56) References Cited

U.S. PATENT DOCUMENTS

2001/0037689 A1* 11/2001 Krouth ................ F15B 15/2838
73/861.52
2003/0136196 A1* 7/2003 Wiklund ............. F15B 15/2838
73/716
(Continued)

OTHER PUBLICATIONS

International Search Report dated Jul. 22, 2014 issued in International Application No. PCT/JP2014/066791.

*Primary Examiner* — Paul D Lee
(74) *Attorney, Agent, or Firm* — Adams & Wilks

(57) ABSTRACT

An arithmetic processing unit included in a pressure change measuring apparatus includes a differential pressure calculation unit configured to obtain a pressure difference between an inner pressure of a cavity and a pressure to be measured based on an output signal of a differential pressure measuring cantilever. A pressure-to-be-measured calculating unit calculates the pressure to be measured based on a set inner pressure of the cavity and the differential pressure calculated by the differential pressure calculation unit. A flow rate calculating unit calculates a flowing quantity of a pressure transmission medium flowing into and out of the cavity for every unit of a predetermined time period based on the differential pressure calculated by the differential pressure calculation unit. An inner pressure updating unit calculates the inner pressure of the cavity after the predetermined time period based on the flowing quantity calculated by the flow rate calculating unit and a volume of the cavity, and updates, to the calculated inner pressure, a set value of the inner pressure of the cavity to be used by the pressure-to-be-measured calculating unit.

12 Claims, 14 Drawing Sheets

(56) References Cited

U.S. PATENT DOCUMENTS

| | | | |
|---|---|---|---|
| 2005/0066709 A1* | 3/2005 | Zachary | G01M 3/2869 |
| | | | 73/46 |
| 2010/0055821 A1* | 3/2010 | Buhler | B81C 1/00087 |
| | | | 438/51 |
| 2010/0206054 A1* | 8/2010 | Sasaki | G01M 3/3263 |
| | | | 73/40.7 |
| 2014/0338459 A1* | 11/2014 | Besling | G01L 9/0073 |
| | | | 73/718 |
| 2015/0096388 A1 | 4/2015 | Shimoyama et al. | |
| 2016/0320255 A1* | 11/2016 | Chiou | G01L 9/0042 |
| 2016/0374353 A1* | 12/2016 | Faraldi | A21B 3/04 |
| | | | 426/231 |

\* cited by examiner

FIG. 5 (A)
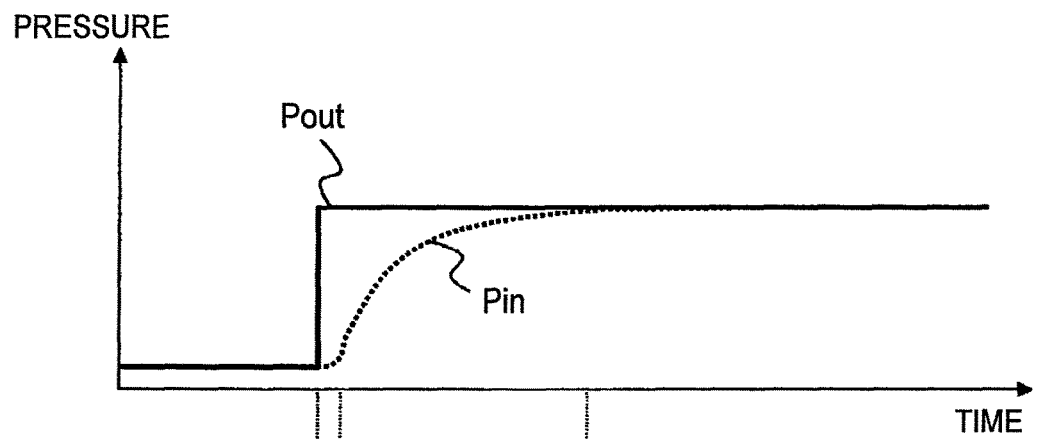
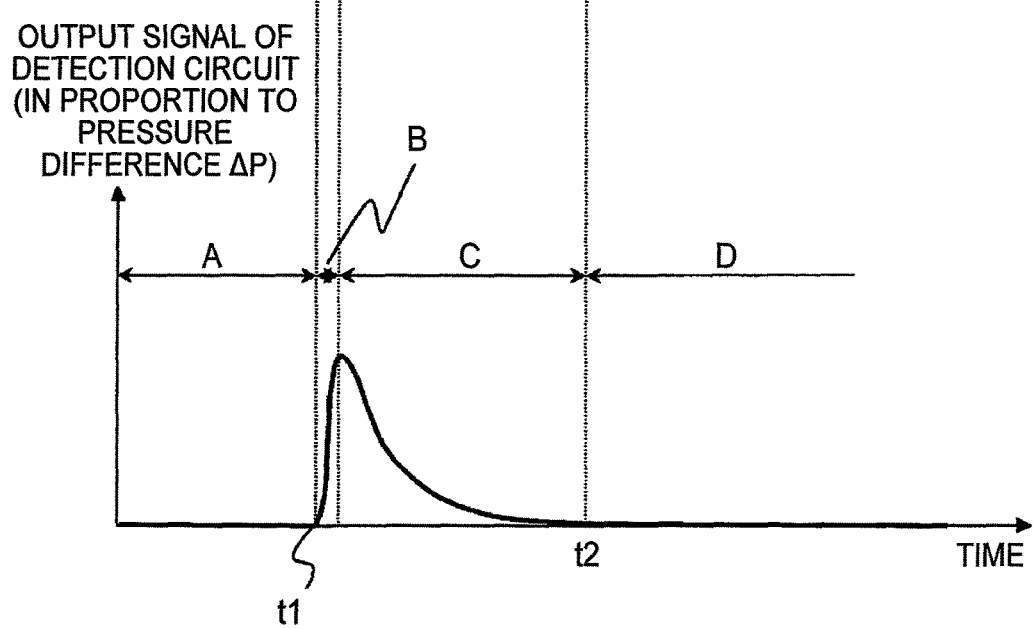
FIG. 5 (B)

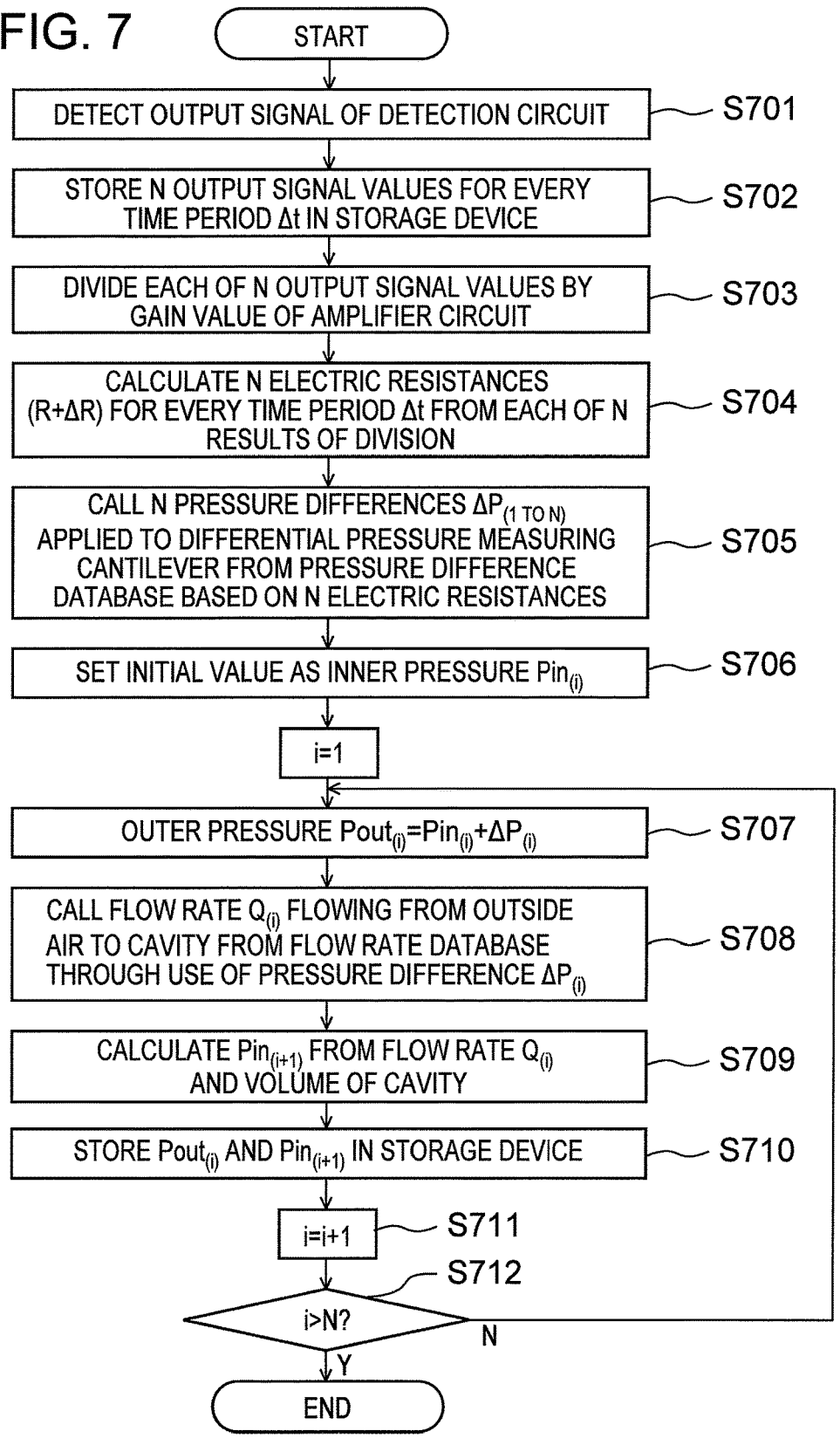

| ΔP[Pa] | ΔR/R |
|---|---|
| ... | ... |
| -10 | -0.0030 |
| -8 | -0.0024 |
| -6 | -0.0018 |
| -4 | -0.0012 |
| -2 | -0.0006 |
| 0 | 0 |
| 2 | 0.0007 |
| 4 | 0.0012 |
| 6 | 0.0019 |
| 8 | 0.0024 |
| 10 | 0.0030 |
| ... | ... |

| ΔP[Pa] | Q[m3/sec] |
|---|---|
| 0.5 | 1.31E-10 |
| 1 | 2.6258E-10 |
| 2 | 5.257E-10 |
| 3 | 7.8948E-10 |
| 4 | 1.05408E-09 |
| 5 | 1.31966E-09 |
| ... | ... |

| DEFORMATION AMOUNT[μm] | ΔR/R |
|---|---|
| ... | ... |
| -5.9 | -0.0297 |
| -4.72 | -0.0242 |
| -3.54 | -0.0176 |
| -2.36 | -0.0121 |
| -1.18 | -0.0055 |
| 0 | 0 |
| 1.18 | 0.0066 |
| 2.36 | 0.0121 |
| 3.54 | 0.0187 |
| 4.72 | 0.0242 |
| 5.9 | 0.0297 |
| ... | ... |

| FREQUENCY [Hz] | AMPLITUDE OF LEADING END[dB] |
|---|---|
| ... | ... |
| 25 | -95.50475 |
| 50 | -85.50704 |
| 75 | -68.2005 |
| 100 | -64.03312 |
| 125 | -59.74888 |
| 150 | -54.66469 |
| 175 | -53.02856 |
| 200 | -47.7781 |
| ... | ... | ness
PRESSURE CHANGE MEASURING APPARATUS AND PRESSURE CHANGE MEASURING METHOD

TECHNICAL FIELD

The present invention relates to a pressure change measuring apparatus and a pressure change measuring method for detecting a minute pressure change.

BACKGROUND ART

Hitherto, there is known a pressure change measuring apparatus for detecting a minute pressure change, which has structure including an inner chamber (pressure chamber), a differential pressure gauge (diaphragm or the like) configured to detect a differential pressure between a pressure of the inner chamber (pressure chamber) and a pressure to be measured, and a pressure through hole configured to allow flowing of a pressure transmission medium for transmitting pressure to be measured into and out of the inner chamber (pressure chamber) (see, for example, PTLs 1 to 3). The pressure through hole has extremely small structure, and restricts the flowing of the pressure transmission medium into the inner chamber (pressure chamber). Further, the pressure within the inner chamber (pressure chamber) changes depending on an amount of the pressure transmission medium flowing into and out of the inner chamber (pressure chamber), and hence the pressure within the inner chamber (pressure chamber) follows the change in the pressure to be measured with a delay. Therefore, the differential pressure between the pressure of the inner chamber (pressure chamber) and the pressure to be measured is detected, to thereby be able to extract and detect only the pressure change to be measured. Such a pressure change measuring apparatus has a feature that a minute pressure change can be detected with high sensitivity irrespective of a ratio of the pressure change to the pressure (absolute pressure) to be measured.

CITATION LIST

Patent Literature

[PTL 1] JP 48-12778 A
[PTL 2] JP 02-52229 A
[PTL 3] JP 04-208827 A

SUMMARY OF INVENTION

Technical Problem

However, according to the related-art pressure change measuring apparatus described above, it is possible to detect a minute pressure change with high sensitivity, but it is difficult to detect a temporal detail of a pressure change, that is, a time variation of a pressure to be measured.

That is, as disclosed in PTL 1, with the related-art pressure change measuring apparatus, when the pressure to be measured changes cyclically, a pressure of an inner chamber (pressure chamber) changes in accordance with (follows) the pressure to be measured with a delay of a fixed time period. Therefore, a differential pressure between the pressure to be measured and the pressure of the inner chamber (pressure chamber) exhibits a change similar to the pressure change to be measured although there is a fixed time difference from the pressure to be measured. The differential pressure at this time is obtained as an output signal of an apparatus, which facilitates detection of the time variation of the pressure to be measured based on the output signal.

Meanwhile, when the pressure to be measured does not change cyclically, as shown in, for example, FIG. 5(A) described later, when the pressure to be measured (Pout in FIG. 5(A)) rises stepwise, the pressure of the inner chamber (pressure chamber) (Pin in FIG. 5(A)) gradually rises following the pressure to be measured. The differential pressure between the pressure to be measured and the pressure of the inner chamber (pressure chamber) at this time is obtained as the output signal of the apparatus (see FIG. 5(B)). Therefore, the output signal of the pressure change measuring apparatus starts rising at the moment when the pressure to be measured rises stepwise (see a period B in FIG. 5). Then, in a period after the pressure to be measured rises, the pressure of the inner chamber (pressure chamber) rises following the rise of the pressure to be measured, and hence the output signal gradually decreases (see a period C in FIG. 5).

In short, a rising tendency of the output signal within the period B indicates that the pressure to be measured actually rises, but the decreasing tendency of the output signal within the period C indicates that the pressure to be measured drops even though the pressure to be measured does not actually vary with time.

As described above, the output signal of the related-art pressure change measuring apparatus does not represent a time gradient of the pressure change to be measured itself, which raises a problem in that the time variation of the pressure to be measured cannot be grasped even when the output signal is subjected to the simple integration processing or the like.

Therefore, the present invention provides a pressure change measuring apparatus and a pressure change measuring method that are capable of accurately detecting a time variation of a pressure (temporal detail of the pressure) to be measured.

Solution to Problem

In order to solve the above-mentioned problem, a first feature of a pressure change measuring apparatus according to one embodiment of the present invention resides in a pressure change measuring apparatus for detecting a time variation of a pressure to be measured, including: a differential pressure sensor, which has a cavity having a predetermined volume and a communication hole configured to allow a pressure transmission medium for transmitting the pressure to be measured to flow into and out of the cavity, and is configured to output an output signal relating to a differential pressure between an inner pressure of the cavity and the pressure to be measured; and an arithmetic processing unit configured to calculate the time variation of the pressure to be measured, in which the arithmetic processing unit includes: a differential pressure calculation unit configured to obtain the differential pressure between the inner pressure of the cavity and the pressure to be measured based on the output signal of the differential pressure sensor; a pressure-to-be-measured calculating unit configured to calculate the pressure to be measured based on a set inner pressure of the cavity and the differential pressure calculated by the differential pressure calculation unit; a flow rate calculating unit configured to calculate a flowing quantity of the pressure transmission medium flowing into and out of the cavity for every unit of a predetermined time period based on the differential pressure calculated by the differential pressure calculation unit; and an inner pressure updating unit configured to calculate the inner pressure of the cavity after the predetermined time period based on the flowing quantity calculated by the flow rate calculating unit and the predetermined volume of the cavity, and to update, to the calculated inner pressure, a set value of the inner pressure of the cavity to be used by the pressure-to-be-measured calculating unit.

According to the above-mentioned feature, through use of the configuration of the cavity and the differential pressure sensor configured to detect a minute pressure change, it is possible to convert and calculate the pressure change from the output signal of the differential pressure sensor. The pressure change measuring apparatus according to the one embodiment of the present invention is configured to calculate the inner pressure of the cavity after the predetermined time period (at the timing when the pressure-to-be-measured calculating unit subsequently calculates the pressure to be measured) from the flowing quantity of the pressure transmission medium flowing into and out of the cavity and the volume of the cavity, and to calculate the pressure to be measured through use of the inner pressure, to thereby be able to accurately detect the time variation of the actual pressure to be measured.

A second feature of the pressure change measuring apparatus according to the one embodiment of the present invention resides in that: the arithmetic processing unit further includes a flow rate database unit configured to store in advance the flowing quantity of the pressure transmission medium corresponding to a level of the differential pressure between the inner pressure of the cavity and the pressure to be measured; and the flow rate calculating unit is configured to extract, from the flow rate database unit, the flowing quantity of the pressure transmission medium corresponding to the differential pressure calculated by the differential pressure calculation unit.

According to the above-mentioned feature, the flowing quantity of the pressure transmission medium corresponding to the level of the differential pressure is stored in advance in the flow rate database unit, and hence it is possible to easily and quickly identify the flowing quantity of the pressure transmission medium, which corresponds to the differential pressure calculated by the differential pressure calculation unit. The one embodiment of the present invention enables a change in the inner pressure of the cavity to be calculated from the flowing quantity of the pressure transmission medium corresponding to the differential pressure, to thereby be able to convert the pressure change from the output signal of the differential pressure sensor, which indicates the differential pressure between the calculated inner pressure of the cavity and the pressure to be measured.

A third feature of the pressure change measuring apparatus according to the one embodiment of the present invention resides in that the flow rate database unit is generated by obtaining a relationship between a differential pressure between both ends of the communication hole and the flowing quantity of the pressure transmission medium for every unit of the predetermined time period in advance through a numerical calculation, and by calculating the flowing quantity of the pressure transmission medium moving into and out of the cavity for every unit of the predetermined time period based on the relationship and the differential pressure calculated by the differential pressure calculation unit.

According to the above-mentioned feature, the flowing quantity of the pressure transmission medium corresponding to the differential pressure can be obtained through the numerical calculation when structure around the differential pressure sensor is designed, and the change in the inner pressure of the cavity can be calculated through use of the flowing quantity. Therefore, it is possible to convert and calculate the pressure change from the output signal of the differential pressure sensor, which indicates the differential pressure between the inner pressure of the cavity and the pressure to be measured.

A fourth feature of the pressure change measuring apparatus according to the one embodiment of the present invention resides in that: the pressure change measuring apparatus further includes an actually-measured value acquisition unit configured to acquire an actually measured value of the pressure to be measured; and the flow rate calculating unit is configured to: calculate an assumed value of the pressure to be measured through use of a temporary flowing quantity of the pressure transmission medium flowing into and out of the cavity for every unit of the predetermined time period from the output signal of the differential pressure sensor; change the temporary flowing quantity until an error between the assumed value and the actually measured value of the pressure to be measured, which is acquired from the actually-measured value acquisition unit, becomes equal to or smaller than a predetermined value; and calculate, as the flowing quantity, the temporary flowing quantity at a time point when the error becomes equal to or smaller than the predetermined value.

According to the above-mentioned feature, the flowing quantity of the pressure transmission medium corresponding to the differential pressure can be obtained without measuring in advance the flowing quantity in detail to create a database, and the change in the inner pressure of the cavity can be calculated through use of the above-mentioned flowing quantity. That is, the flowing quantity of the pressure transmission medium, which corresponds to an installation environment of the pressure change measuring apparatus according to the one embodiment of the present invention, is calculated as the occasion arises, which eliminates time and labor to, for example, prepare a flow rate database corresponding to the installation environment. Therefore, it is possible to convert the pressure change from the output signal of the differential pressure sensor, which indicates the differential pressure between the inner pressure of the cavity and the pressure to be measured.

A fifth feature of the pressure change measuring apparatus according to the one embodiment of the present invention resides in that the differential pressure sensor includes: a cantilever, which is provided so as to block an opening surface of the cavity other than the communication hole, and is configured to bend to be deformed depending on the differential pressure between the inner pressure of the cavity and the pressure to be measured; and a displacement measuring unit configured to measure a displacement corresponding to the flexural deformation of the cantilever.

According to the above-mentioned feature, the differential pressure sensor is formed of the cantilever, and hence a stress applied in the cantilever by the differential pressure can be increased compared to a case of a differential pressure sensor of a membrane type. Therefore, a large stress can be obtained with a minute differential pressure, and hence it is possible to detect a minute differential pressure, and to convert a minute pressure change in the pressure to be measured.

A sixth feature of the pressure change measuring apparatus according to the one embodiment of the present invention resides in that: the differential pressure sensor is formed of a passage shape in which the communication hole communicates to/from an opening portion of the cavity; and the differential pressure sensor includes: a heat source arranged inside the communication hole; a pair of temperature sensors arranged across the heat source with equal intervals; and a differential pressure measuring unit configured to measure a differential pressure between both ends of the communication hole based on output signals of the pair of temperature sensors.

According to the above-mentioned feature, the movement of the pressure transmission medium within the passage shape is detected, to thereby be able to detect the differential pressure applied to both ends of the passage shape. Therefore, a minute differential pressure can be detected compared to the case of the differential pressure sensor of the membrane type, and it is possible to convert and calculate a minute pressure change in the pressure to be measured.

A seventh feature of a pressure change measuring method according to one embodiment of the present invention resides in a pressure change measuring method for detecting a time variation of a pressure to be measured by a pressure change measuring apparatus including a differential pressure sensor, which has a cavity having a predetermined volume and a communication hole configured to allow a pressure transmission medium for transmitting the pressure to be measured to flow into and out of the cavity, and is configured to output an output signal relating to a differential pressure between an inner pressure of the cavity and the pressure to be measured, the pressure change measuring method including: a differential pressure calculating step of obtaining the differential pressure between the inner pressure of the cavity and the pressure to be measured based on the output signal of the differential pressure sensor; an outer pressure calculating step of calculating the pressure to be measured based on a set inner pressure of the cavity and the differential pressure calculated in the differential pressure calculating step; a flow rate calculating step of calculating a flowing quantity of the pressure transmission medium flowing into and out of the cavity for every unit of a predetermined time period based on the differential pressure calculated in the differential pressure calculating step; and an inner pressure updating step of calculating the inner pressure of the cavity after the predetermined time period based on the flowing quantity calculated in the flow rate calculating step and the predetermined volume of the cavity, and updating, to the calculated inner pressure, a set value of the inner pressure of the cavity to be used in the outer pressure calculating step.

According to the above-mentioned feature, the pressure change in the pressure to be measured can be converted and calculated based on only the output signal of the differential pressure sensor and the volume of the cavity. The pressure change measuring method according to the one embodiment of the present invention includes the calculating of the inner pressure of the cavity after the predetermined time period (at the timing when the pressure to be measured is subsequently calculated in the pressure-to-be-measured calculating step) from the flowing quantity of the pressure transmission medium flowing into and out of the cavity and the volume of the cavity, and the calculating of the pressure to be measured through use of the inner pressure, to thereby be able to accurately detect the time variation of the actual pressure to be measured.

An eighth feature of the pressure change measuring method according to the one embodiment of the present invention resides in that the pressure change measuring method further includes an iterative processing step of repeatedly executing at least the outer pressure calculating step, the flow rate calculating step, and the inner pressure updating step.

According to the above-mentioned feature, the pressure to be measured can be calculated with the inner pressure being updated in every iterative processing step. That is, according to the one embodiment of the present invention, it is possible to convert and calculate the accurate pressure to be measured for the time variation as the occasion arises, A ninth feature of the pressure change measuring method according to the one embodiment of the present invention resides in that the iterative processing step is executed for every set predetermined time period after setting of the predetermined time period.

According to the above-mentioned feature, it is possible to (variably) set the time interval for conducting the iterative processing step, and it is possible to arbitrarily set temporal accuracy of the pressure change in the pressure to be measured, which is to be calculated.

A tenth feature of the pressure change measuring method according to the one embodiment of the present invention resides in that the differential pressure calculating step includes: receiving the output signal of the differential pressure sensor for every predetermined time period; storing each output signal of the differential pressure sensor that has been received in a storage device included in the pressure change measuring apparatus; and obtaining the differential pressure for every predetermined time period based on the stored output signal of the differential pressure sensor.

According to the above-mentioned feature, the output signal of the differential pressure sensor for every predetermined time period is accumulated on the storage device, which eliminates the need to conduct a series of arithmetic operation processing including the differential pressure calculating step, the outer pressure calculating step, the flow rate calculating step, and the inner pressure updating step each time the output signal of the differential pressure sensor is received. Therefore, the arithmetic processing unit can be operated intermittently, which can reduce power consumption.

An eleventh feature of the pressure change measuring method according to the one embodiment of the present invention resides in that the outer pressure calculating step includes setting an initial value as the inner pressure of the cavity during a first iteration of the iterative processing step.

According to the above-mentioned feature, an initial value of the pressure to be measured, which is obtained from the output signal of the differential pressure sensor, can be calculated from the set initial value of the inner pressure of the cavity. Then, the arithmetic operation processing of each step is conducted, to thereby be able to convert the pressure change from the initial value of the pressure to be measured.

A twelfth feature of the pressure change measuring method according to the one embodiment of the present invention resides in that the initial value of the inner pressure of the cavity is an absolute pressure value of the pressure to be measured.

According to the above-mentioned feature, the initial value of the inner pressure of the cavity is set as the absolute pressure value of the pressure to be measured, to thereby be able to prevent the initial value of the pressure to be measured, which is obtained from the output signal of the differential pressure sensor, from greatly differing from an actually measured value. Therefore, it is possible to convert the subsequent pressure change with satisfactory accuracy.

A thirteenth feature of the pressure change measuring method according to the one embodiment of the present invention resides in that the initial value of the inner pressure of the cavity is a value obtained by subtracting, from the absolute pressure value of the pressure to be measured, a value of the differential pressure obtained in the differential pressure calculating step.

According to the above-mentioned feature, the initial value of the inner pressure of the cavity is set by subtracting the value of the differential pressure from the absolute pressure value of the pressure to be measured, and hence the initial value of the inner pressure of the cavity can be set with accuracy substantially equivalent to that of the actually measured value. Therefore, it is possible to convert the subsequent pressure change with satisfactory accuracy.

Advantageous Effects of Invention

According to the present invention, it is possible to accurately detect the time variation of the pressure (temporal detail of the pressure) to be measured through the use of the apparatus for detecting a minute pressure change.

BRIEF DESCRIPTION OF DRAWINGS

FIGS. 5(A)-5(B) are explanatory diagrams for showing output of the detection circuit included in the pressure change measuring apparatus according to the first embodiment of the present invention.

FIG. 7 is a flowchart for illustrating a flow of processing of an arithmetic processing unit included in the pressure change measuring apparatus according to the first embodiment of the present invention.

DESCRIPTION OF EMBODIMENTS

Now, a pressure change measuring apparatus according to each embodiment of the present invention is described with reference to the accompanying drawings.
(First Embodiment)
(Overall Configuration)

Figure 1:
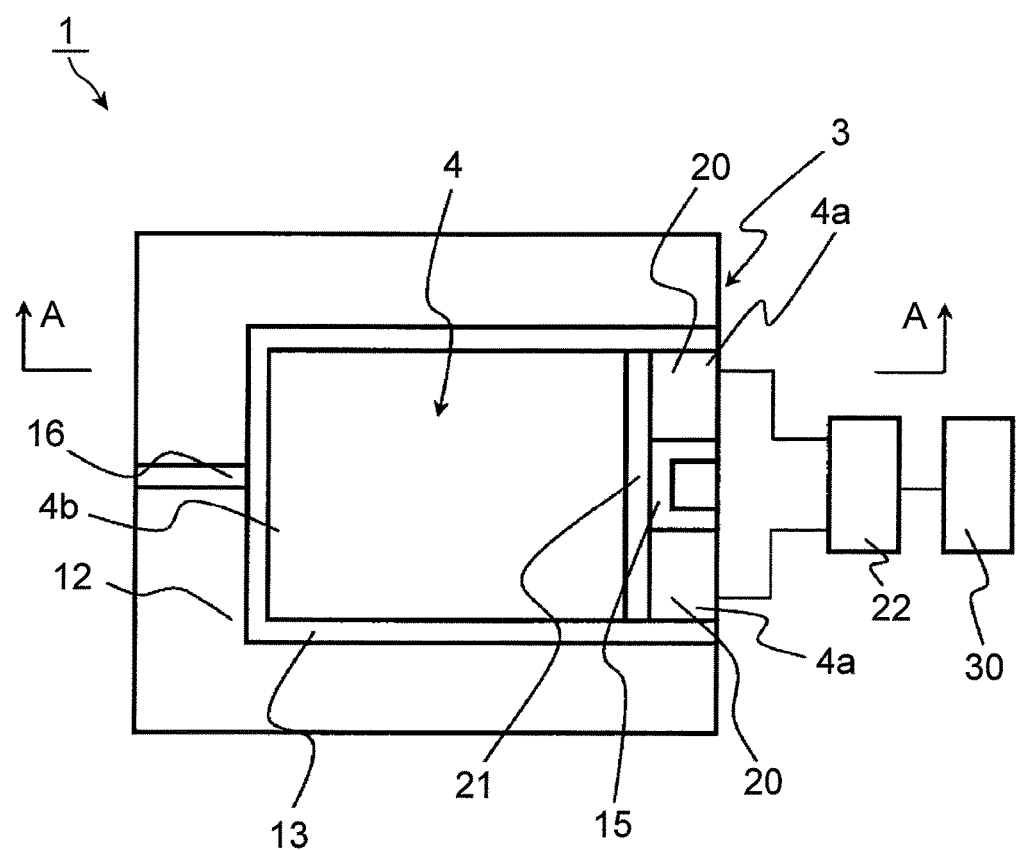
FIG. 1 is an illustration of a configuration of a pressure change measuring apparatus according to a first embodiment of the present invention.
Figure 2:
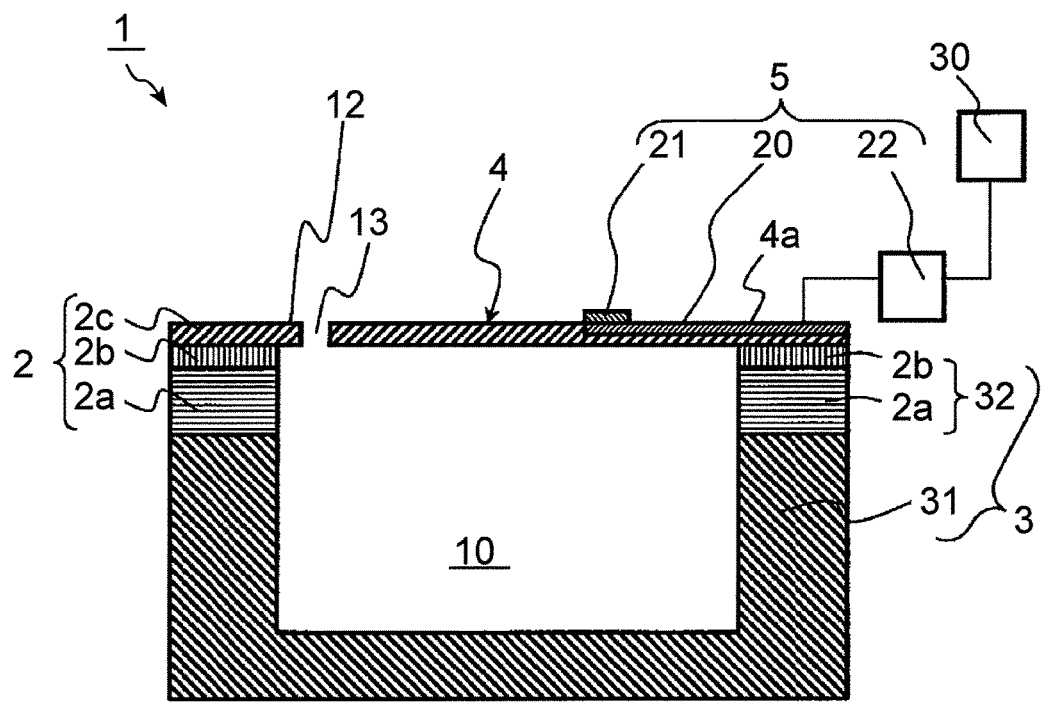
FIG. 2 is a sectional view for illustrating cross-sectional structure of the pressure change measuring apparatus according to the first embodiment of the present invention.

FIG. 1 is an illustration of a configuration of a pressure change measuring apparatus 1 according to a first embodiment of the present invention. FIG. 2 is a sectional view taken along the line A-A indicated in FIG. 1.

The pressure change measuring apparatus 1 according to the first embodiment includes, as illustrated in FIG. 1 and FIG. 2, a differential pressure measuring cantilever 4 configured to be deformed depending on a pressure difference between both sides of the differential pressure measuring cantilever 4, a lid 12 arranged so as to have one end opposed to the differential pressure measuring cantilever 4, a displacement measuring unit 5 configured to measure a displacement of the differential pressure measuring cantilever 4, a cavity casing 3 arranged on one surfaces of the differential pressure measuring cantilever 4 and the lid 12, and an arithmetic processing unit 30 configured to calculate a time variation of a pressure from an output signal of the displacement measuring unit 5.

The cavity casing 3 is a box-shaped member having a cavity 10 as a hollow space formed inside. For example, the cavity casing 3 includes: a first portion 31 formed of a ceramic material to define the cavity 10; and a second portion 32 arranged on the first portion 31 and including a silicon support layer 2a and an oxide layer 2b, e.g., a silicon oxide film, which are described later.

The differential pressure measuring cantilever 4 is formed by, for example, processing an SOI substrate 2 obtained by thermally bonding the silicon support layer 2a, the oxide layer 2b, e.g., a silicon oxide film, and a silicon active layer 2c to one another. Specifically, the differential pressure measuring cantilever 4 is formed of the silicon active layer 2c included in the SOI substrate 2, and has a shape obtained by cutting out from the silicon active layer 2c having a flat shape along a gap 13 formed to have a U shape in plan view.

With this configuration, the differential pressure measuring cantilever 4 has cantilever structure in which the base end portion 4a is set as a fixed end and a leading end portion 4b being an end portion on the side opposed to the lid 12 is set as a free end.

Further, the differential pressure measuring cantilever 4 is arranged so as to cover an upper surface of the cavity 10 formed in the cavity casing 3. In short, the differential pressure measuring cantilever 4 substantially blocks an opening of the cavity 10.

The differential pressure measuring cantilever 4 is cantilever-supported by being integrally fixed onto the second portion 32 of the cavity casing 3 through the base end portion 4a. This allows the differential pressure measuring cantilever 4 to bend to be deformed relative to the base end portion 4a depending on a pressure difference (differential pressure) between the inside and outside of the cavity 10.

A through hole 15 having a U shape in plan view is formed in the base end portion 4a of the differential pressure measuring cantilever 4 so as to facilitate the flexural deformation of the differential pressure measuring cantilever 4. However, the shape of the through hole 15 is not limited to the above-mentioned U shape as long as the shape facilitates the flexural deformation of the differential pressure measuring cantilever 4.

The lid 12 is positioned above the cavity 10, and is arranged around the differential pressure measuring cantilever 4 across the gap 13. The lid 12 is formed of the silicon active layer 2c.

The displacement measuring unit 5 includes: piezoresistors 20 configured to have an electric resistance changed depending on a stress applied thereto; and a detection circuit 22 configured to extract the change in the electric resistance.

As illustrated in FIG. 1, a pair of piezoresistors 20 are arranged on both sides across the through hole 15 on a short-side direction of the differential pressure measuring cantilever 4. The pair of piezoresistors 20 are electrically connected to each other through a wiring 21 formed of a conductive material.

An overall shape including the wiring 21 and the piezoresistors 20 can be formed to have a U shape in plan view as illustrated in, for example, FIG. 1, but it should be understood that the shape may have another layout.

The detection circuit 22 is a circuit which is connected to each of the piezoresistors 20, and is configured to output a signal based on the change in the electric resistance of the piezoresistors 20.

Figure 3:
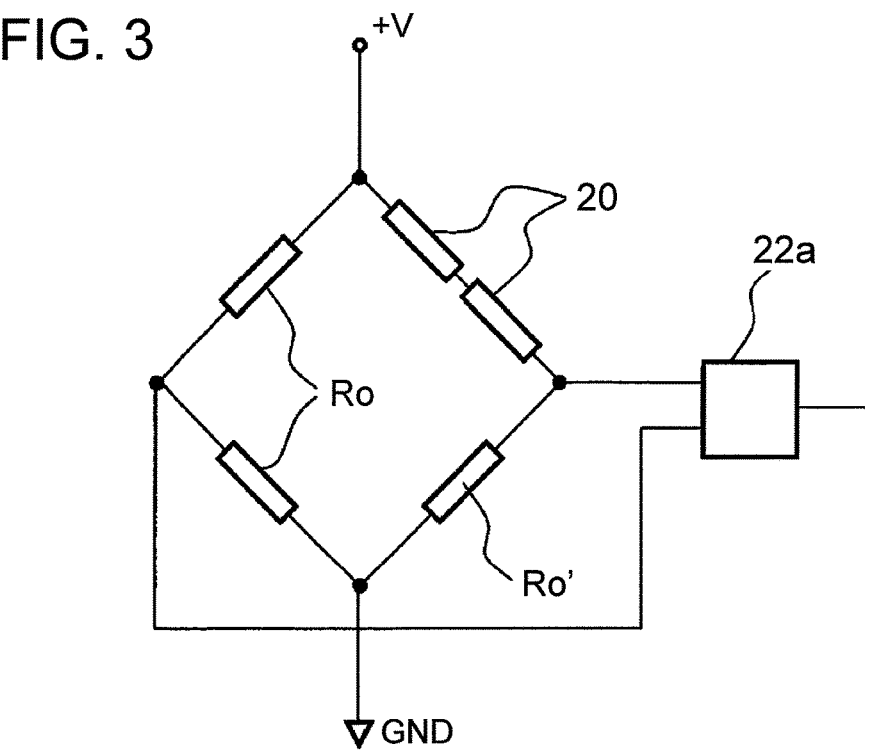
FIG. 3 is an explanatory diagram for illustrating a configuration of a detection circuit included in the pressure change measuring apparatus according to the first embodiment of the present invention.

The detection circuit 22 described above includes a bridge circuit and an amplifier circuit 22a as illustrated in, for example, FIG. 3. That is, the detection circuit 22 can extract the change in the electric resistance of the piezoresistors 20 as a voltage change by forming the bridge circuit through use of the piezoresistors 20, fixed resistors Ro, and a variable resistor Ro'. Then, the detection circuit 22 amplifies the voltage change by the amplifier circuit 22a, and outputs the amplified voltage change.

The piezoresistors 20 described above are formed by, for example, doping the silicon active layer 2c with a dopant (impurities), e.g., phosphorus, by an ion implantation method, a diffusion method, or other such various methods. The dopant is added to only the vicinity of the surface of the silicon active layer 2c. Therefore, the change in the electric resistance of the piezoresistors is exhibited in a reverse direction in terms of plus or minus to a direction of compression or extension of the stress applied to the cantilever.

The pair of the piezoresistors 20 are configured to become electrically conductive to each other through only the wiring 21. Therefore, although not shown, the silicon active layer 2c in the vicinity of the wiring 21 within the differential pressure measuring cantilever 4 is etched so as to inhibit the piezoresistors 20 from becoming conductive to each other through any portion other than the wiring 21. The silicon active layer 2c in the vicinity of the wiring 21 described above may be partially doped with impurities, to thereby omit the etching.

The arithmetic processing unit 30 is connected to the detection circuit 22, and includes: an integrated circuit (not shown) configured to conduct a predetermined arithmetic operation from the output signal of the detection circuit 22, and to calculate the time variation of the pressure; and a storage device (not shown) configured to store programs and values to be used by the integrated circuit.

(Control Processing of Pressure Change Measuring Apparatus)

Figure 4:
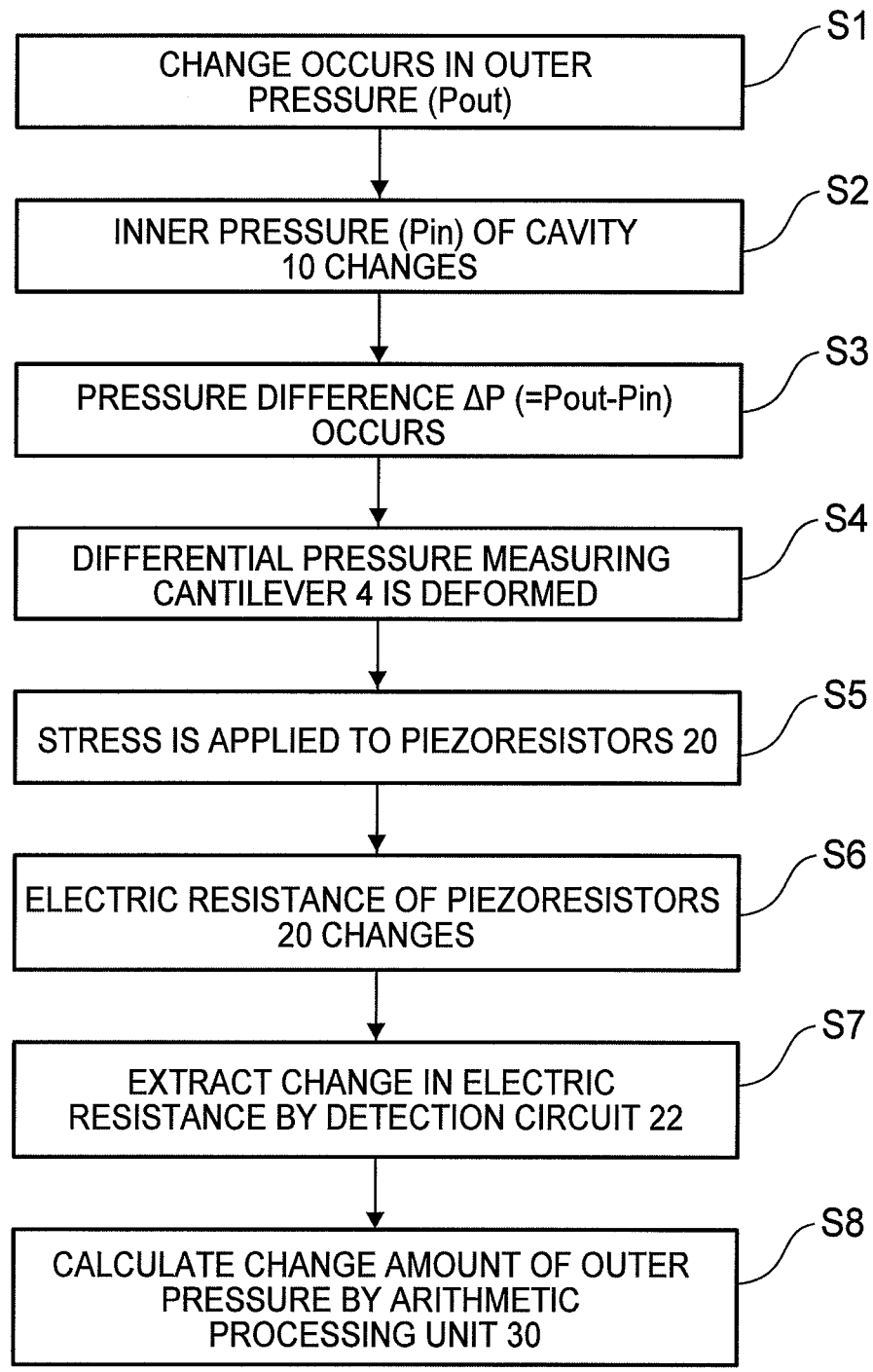
FIG. 4 is an explanatory diagram for illustrating a flow of functions of the pressure change measuring apparatus according to the first embodiment of the present invention.

Next, referring to a flowchart of FIG. 4, a description is made of a flow of control processing conducted when the pressure of the outside (outer pressure) of the pressure change measuring apparatus 1 changes until the time variation of the outer pressure is calculated by the pressure change measuring apparatus 1.

First, there occurs a change in the pressure of the outside of the pressure change measuring apparatus 1, specifically, a pressure (hereinafter referred to as "outer pressure Pout") on the side of a surface opposed to a surface where the differential pressure measuring cantilever 4 is arranged onto the cavity casing 3 (that is, upper surface in FIG. 2) (Step S1).

Then, an inner pressure (hereinafter referred to as "inner pressure Pin") inside the cavity 10 changes so as to follow the change in the outer pressure Pout exhibited in Step S1 (Step S2). In this case, the gap 13 functions as a communication hole configured to communicate between the inside and outside of the cavity 10, and hence a pressure transmission medium moves from a high-pressure side to a low-pressure side depending on the differential pressure applied to both sides of the differential pressure measuring cantilever 4. However, the movement of the pressure transmission medium is regulated by the minute gap 13, and hence the inner pressure Pin does not rapidly change depending on the change in the outer pressure Pout, and follows the change in the outer pressure Pout with a delay.

Then, a pressure difference (hereinafter referred to as "differential pressure $\Delta P$=Pout−Pin") occurs between both side surfaces of the differential pressure measuring cantilever 4 due to the above-mentioned delay of the inner pressure Pin from the change in the outer pressure Pout (Step S3). As a result, the differential pressure measuring cantilever 4 bends to be deformed depending on the differential pressure $\Delta P$ (Step S4).

At that time, a stress is applied to the piezoresistors 20 provided to the base end portion of the differential pressure measuring cantilever 4 (Step S5), and the electric resistance of the piezoresistors 20 changes (Step S6). In this case, the detection circuit 22 extracts a change amount of the electric resistance of the piezoresistors 20 by causing current to flow through the piezoresistors 20 (Step S7). When the signal corresponding to the change amount of the electric resistance of the piezoresistors 20 is input from the detection circuit 22, the arithmetic processing unit 30 calculates the change amount of Pout based on the input signal (Step S8).

(Action of Differential Pressure Measuring Cantilever Conducted when Outer Pressure Changes and Output Characteristic of Detection Circuit)

Next, an action of the differential pressure measuring cantilever 4 conducted when the outer pressure Pout changes and an output characteristic of the detection circuit 22 exhibited at that time are described with reference to FIG. 5 and FIG. 6.

Figure 6A:
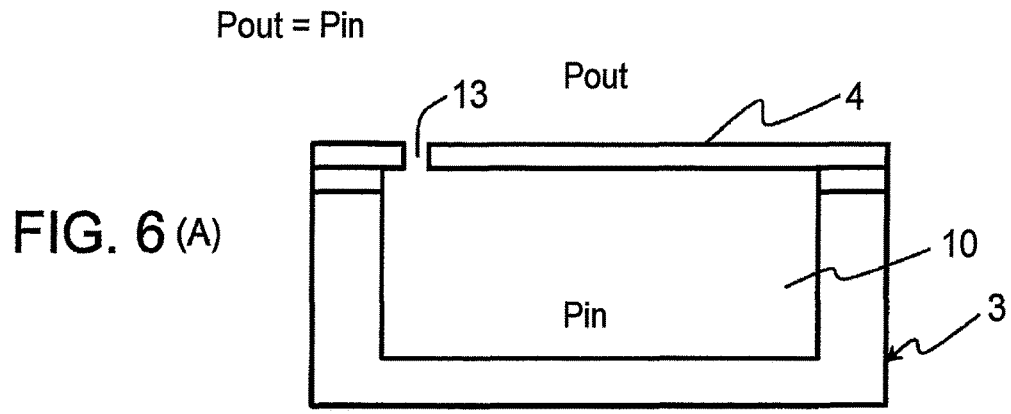
FIGS. 6(A)-6(C) are explanatory diagrams for illustrating an action of a differential pressure measuring cantilever included in the pressure change measuring apparatus according to the first embodiment of the present invention.
Figure 6B:
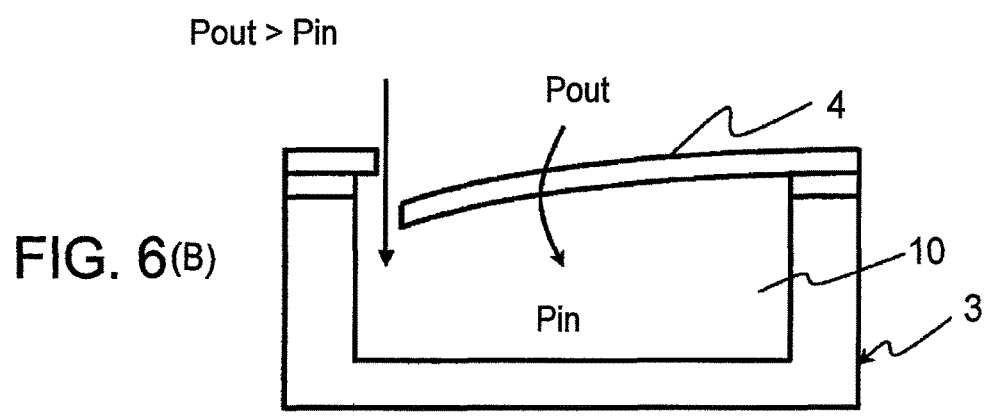
Figure 6C:
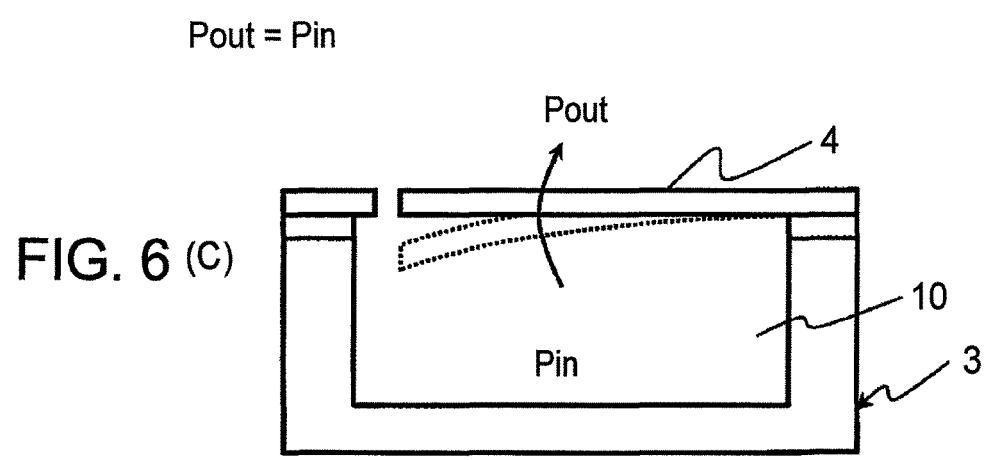

FIG. 5 are graphs for schematically showing an example of the output characteristic of the detection circuit 22 illustrated in FIG. 1. FIG. 5(A) is a graph for showing variations with time of the outer pressure Pout and the inner pressure Pin, and FIG. 5(B) is a graph for showing a variation with time of the output signal of the detection circuit 22. FIG. 6 are sectional views for schematically illustrating an example of the action of the differential pressure measuring cantilever 4 illustrated in FIG. 1 and FIG. 2. FIG. 6(A) is the sectional view of the differential pressure measuring cantilever 4 for illustrating an initial state, FIG. 6(B) is the sectional view of the differential pressure measuring cantilever 4 for illustrating a state in which the outer pressure Pout is higher than the inner pressure Pin, and FIG. 6(C) is the sectional view of the differential pressure measuring cantilever 4 for illustrating a state in which the pressures inside and outside the cavity have become the same again. In FIG. 6, the illustration of the detection circuit 22 is omitted.

First, when the outer pressure Pout and the inner pressure Pin are equal to each other with the differential pressure $\Delta P$ being zero as shown in a period A within FIG. 5(A), the differential pressure measuring cantilever 4 does not bend to be deformed as illustrated in FIG. 6(A).

For example, when the outer pressure Pout rises stepwise as shown in a period B after a time t1 within FIG. 5(A), the inner pressure Pin cannot rapidly change, and produces the differential pressure $\Delta P$. Thus, as illustrated in FIG. 6(B), the differential pressure measuring cantilever 4 bends to be deformed toward the inside of the cavity 10. Then, a stress is applied to the piezoresistors 20 depending on the flexural deformation of the differential pressure measuring cantilever 4, and the electric resistance changes. Therefore, as shown in FIG. 5(B), the output signal of the detection circuit 22 increases.

After the rise of the outer pressure Pout (after the time t1), the pressure transmission medium gradually flows into the inside of the cavity 10 from the outside through the gap 13. Therefore, as shown in FIG. 5(A), with the lapse of time, the inner pressure Pin rises with a delay from the outer pressure Pout while gently responding to changes of the outer pressure Pout.

As a result, the inner pressure Pin gradually approaches the outer pressure Pout, and hence the bending of the differential pressure measuring cantilever 4 gradually decreases, which gradually lowers the above-mentioned output signal as shown in FIG. 5(B).

When the inner pressure Pin becomes the same as the outer pressure Pout as shown in a period D after a time t2 within FIG. 5(A), as illustrated in FIG. 6(C), the flexural deformation of the differential pressure measuring cantilever 4 is canceled to recover the initial state illustrated in FIG. 6(A). In addition, as shown in FIG. 5(B), the output signal of the detection circuit 22 returns to zero as well.

In this manner, it is possible to detect a change in the differential pressure $\Delta P$, and a change in the outer pressure Pout in turn, by monitoring the changes of the output signal of the detection circuit 22 based on the displacement of the differential pressure measuring cantilever 4.

In particular, the differential pressure measuring cantilever 4 can be formed by a semiconductor processing technology through use of the silicon active layer 2c of the SOI substrate 2, and is therefore made thinner (to have a thickness of, for example, from several tens to several hundreds of nanometers) than the related-art piezoelectric element. Therefore, it is possible to detect minute pressure changes with satisfactory accuracy.

(Calculation Flow for Time Variation of Outer Pressure)

Next, a calculation flow for the time variation of the outer pressure Pout conducted by the arithmetic processing unit 30 is described with reference to a flowchart of FIG. 7.

The arithmetic operation processing of the arithmetic processing unit 30 is conducted by arithmetically operating from the change in the outer pressure Pout to the output signal of the detection circuit 22 within the above-mentioned control processing of the pressure change measuring apparatus approximately in a reverse order. In short, the arithmetic processing unit 30 performs arithmetic operation processing in Step S1 to Step S8 within FIG. 4 approximately in a reverse order.

First, when the output signal is detected within the detection circuit 22 as described in Step S7 (Step S701), the arithmetic processing unit 30 stores N values of the output signal of the detection circuit 22 in the storage device (not shown) for every fixed time period $\Delta t$ (Step S702).

Subsequently, the arithmetic processing unit 30 divides the above-mentioned output signal by an amplification factor (gain value) of the amplifier circuit 22a included in the detection circuit 22, to thereby calculate N voltage values for every fixed time period $\Delta t$, which are output from the bridge circuit illustrated in FIG. 3 (Step S703). Subsequently, the arithmetic processing unit 30 calculates N electric resistances $R+\Delta R$ of the piezoresistors 20 for every fixed time period $\Delta t$ from a result of the division conducted in Step S703 (voltage value obtained from the bridge circuit), resistance values Ro of the resistor elements included in the bridge circuit, and a voltage supplied to the bridge circuit (Step S704). The electric resistance R represents an electric resistance of the piezoresistors 20 obtained when the differential pressure $\Delta P$ is zero, and the electric resistance $\Delta R$ represents a change amount of the electric resistance of the piezoresistors 20, which has changed depending on the applied differential pressure $\Delta P$.

Subsequently, the arithmetic processing unit 30 (differential pressure calculation unit) obtains N differential pressures ΔP (ΔP(1 to N)) applied to the differential pressure measuring cantilever from a differential pressure database based on the electric resistances R+ΔR of the piezoresistors 20 obtained in Step S704 (Step S705; differential pressure calculating step). The differential pressure database stores a relationship between the differential pressure ΔP and a rate of change resistance ΔR/R shown in FIG. 8 for each value of the differential pressure ΔP.

Figures 8, 9:
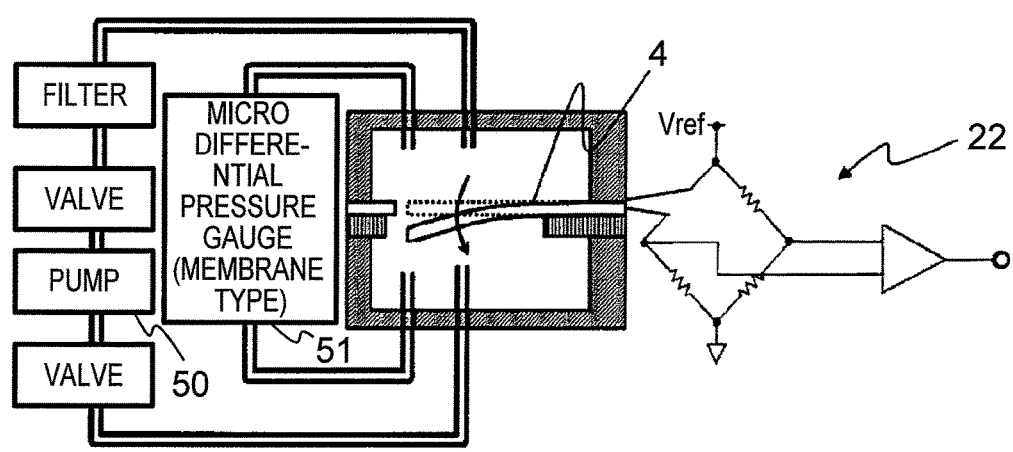
FIG. 8 is an explanatory diagram for showing a relationship between an electric resistance and a differential pressure between the differential pressure measuring cantilever and the detection circuit that are included in the pressure change measuring apparatus according to the first embodiment of the present invention.
FIG. 9 is an explanatory diagram for illustrating a configuration for measuring characteristics of the differential pressure measuring cantilever and the detection circuit that are included in the pressure change measuring apparatus according to the first embodiment of the present invention.

The differential pressure database described above is built by measuring the differential pressure ΔP through use of the differential pressure measuring cantilever 4 and the detection circuit 22 with a configuration illustrated in FIG. 9. In short, the pressure transmission medium supplied from a pump 50 is guided to the differential pressure measuring cantilever 4 to generate the differential pressure ΔP on both sides of the differential pressure measuring cantilever 4. The accurate differential pressure ΔP at that time is measured by a micro differential pressure gauge 51 of a membrane type, and at the same time, the electric resistance R+ΔR of the piezoresistors 20 provided to the differential pressure measuring cantilever 4 is obtained. Then, the differential pressure database that stores the rate of change resistance ΔR/R for each differential pressure ΔP is built from the relationship between the differential pressure ΔP and the electric resistance R+ΔR of the piezoresistors 20. Therefore, the arithmetic processing unit 30 can calculate the differential pressure ΔP applied to the differential pressure measuring cantilever 4 based on the differential pressure database, the electric resistance R of the piezoresistors 20 obtained when the differential pressure ΔP is zero, and the electric resistance R+ΔR of the piezoresistors 20 calculated in Step S704.

Subsequently, the arithmetic processing unit 30 (pressure-to-be-measured calculating unit) sets an initial value as a first inner pressure Pin(1) at the earliest time among inner pressures Pin(i) (i=1 to N; N represents a natural number equal to or larger than 2) (Step S706). The inner pressure Pin (1) according to this embodiment is set to the atmospheric pressure on the assumption that the apparatus is used in the air. Subsequently, the arithmetic processing unit 30 adds Pin(i) and the differential pressure ΔP(i) to calculate an outer pressure Pout(i) (Step S707; pressure-to-be-measured calculating step).

Figures 10, 11:
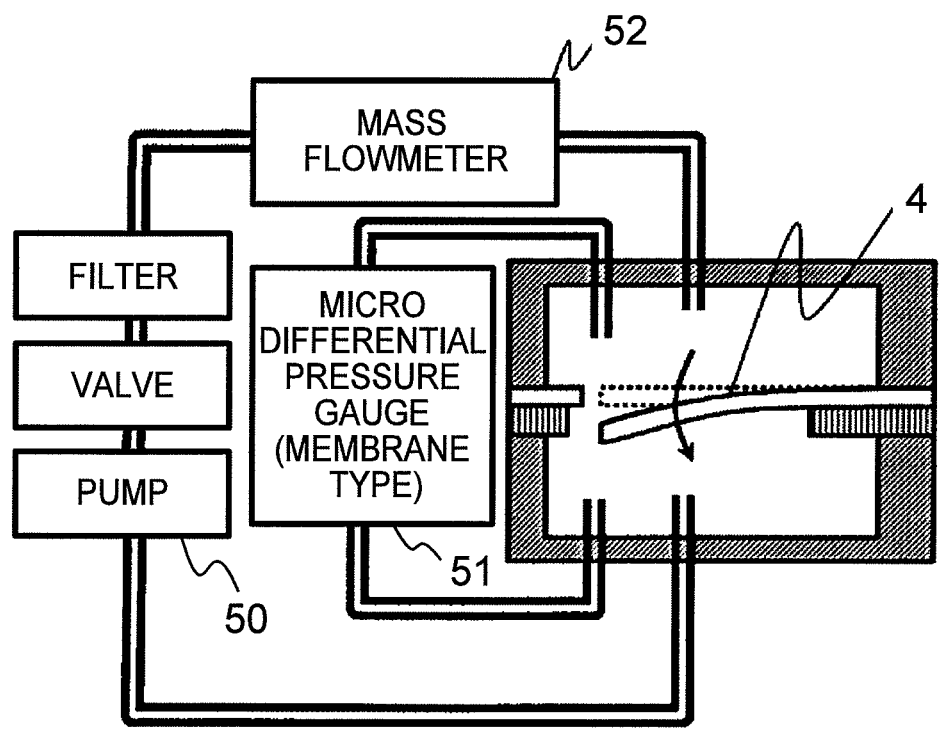
FIG. 10 is an explanatory diagram for showing a relationship between the differential pressure and the flow rate regarding the differential pressure measuring cantilever included in the pressure change measuring apparatus according to the first embodiment of the present invention.
FIG. 11 is an explanatory diagram for illustrating a configuration for measuring a characteristic of the differential pressure measuring cantilever included in the pressure change measuring apparatus according to the first embodiment of the present invention.

Subsequently, the arithmetic processing unit 30 (flow rate calculating unit) uses the differential pressure ΔP(i) to read a flow rate Q(i) of the pressure transmission medium flowing into the cavity 10 from a flow rate database (Step S708; flow rate calculating step). The flow rate database (flow rate database unit) stores a relationship between the differential pressure ΔP and a flow rate Q shown in FIG. 10 for each value of the differential pressure ΔP. The flow rate database is built by measuring in advance the differential pressure and the flow rate through use of the differential pressure measuring cantilever 4 with a configuration illustrated in FIG. 11. Specifically, the pressure transmission medium supplied from the pump 50 is guided to the differential pressure measuring cantilever 4 to generate the differential pressure on both sides of the differential pressure measuring cantilever 4. The accurate differential pressure ΔP at that time is measured by the micro differential pressure gauge 51, and at the same time, the flow rate Q is measured by a flowmeter 52 (mass flowmeter or the like) provided between the pump 50 and the differential pressure measuring cantilever 4. With this configuration, it is possible to obtain a relationship between the differential pressure ΔP and the flow rate Q of the pressure transmission medium flowing between both sides of the differential pressure measuring cantilever 4. In short, the arithmetic processing unit 30 can identify the flow rate Q of the pressure transmission medium flowing into the cavity based on the differential pressure ΔP with reference to the flow rate database built from the above-mentioned relationship.

The relationship between the differential pressure ΔP and the flow rate Q not only depends on the above-mentioned actual measurements of the differential pressure and the flow rate, but also can be obtained through a numerical calculation. For example, the above-mentioned relationship can be identified by conducting a calculation using a finite element method or the like based on a dimension and material characteristics of the differential pressure measuring cantilever 4, the differential pressure ΔP applied to the differential pressure measuring cantilever 4, characteristics of the pressure transmission medium, and the like. In short, when a predetermined differential pressure ΔP is applied to the differential pressure measuring cantilever 4, the differential pressure measuring cantilever 4 is deformed to expand the gap 13. Then, a quantity (flow rate) of the pressure transmission medium passing through the gap 13 per unit time period is calculated by a fluid-structure interaction analysis using the above-mentioned finite element method or the like. The relationship between the differential pressure ΔP applied to the differential pressure measuring cantilever 4 and the flow rate Q can be identified by repeatedly conducting the above-mentioned calculation for each of a plurality of differential pressures ΔP, and hence the flow rate database can be built.

Subsequently, the arithmetic processing unit 30 calculates the inner pressure Pin(i+1) after a time period of Δt from the flow rate Q(i) and a volume V of the cavity (Step S709). It is assumed that the fixed time period Δt is extremely short, the change amount of the outer pressure Pout for every Δt is extremely small, and a heat transfer and a pressure loss are negligibly small. Therefore, the inner pressure Pin increases in proportion to an amount of the pressure transmission medium that has flowed in the cavity 10. Hence, a relationship among the flow rate Q (i), the volume V, the inner pressure Pin(i+1), and the inner pressure Pin (i) can be expressed by Expression (1).

$$Pin(i) \times V = Pin(i+1) \times (V + Q(i) \times \Delta t) \quad (1)$$

Therefore, the arithmetic processing unit 30 can obtain Pin(i+1) after the time period of Δt by Expression (2).

$$Pin(i+1) = V/(V + Q(i) \times \Delta t) \times Pin(i) \quad (2)$$

Subsequently, the arithmetic processing unit 30 stores Pin(i+1) obtained in Step S709 and Pout (i) calculated initially in the storage device included in the arithmetic processing unit 30 (Step S710).

Subsequently, the arithmetic processing unit 30 substitutes i+1 into i (Step S711), and determines whether or not i exceeds N (Step S712). When determining that i is equal to or smaller than N (Step S712; N), the arithmetic processing unit 30 repeatedly conducts the processing of Steps S707 to S710 (iterative processing step). During the iteration, the arithmetic processing unit 30 (inner pressure updating unit) updates the inner pressure Pin used in Step S707 to Pin(i+1) calculated in Step S709 (inner pressure updating step).

When determining that i exceeds N (Step S712; Y), the arithmetic processing unit 30 brings the processing to an end. This allows the arithmetic processing unit 30 to accumulate N outer pressures Pout for every time period of Δt within the storage device. This information indicates how the outer pressure Pout has changed during the period of N×Δt.

The above-mentioned Δt (predetermined time period) may be appropriately set by a user through a user interface unit (not shown) included in the pressure change measuring apparatus 1.

With the above-mentioned configuration, the arithmetic processing unit 30 can measure a temporal detail of the outer pressure Pout, that is, the change amount of the outer pressure Pout, which cannot be easily obtained from the output signal of the detection circuit 22.

MODIFICATION EXAMPLE 1

(Calculation Example without Use of Database)

When executing the calculation flow for the change amount of the outer pressure Pout of FIG. 7, the arithmetic processing unit 30 according to the first embodiment uses the differential pressure database in Step S705 and the flow rate database in Step S708.

At this time, as in this modification example, the arithmetic processing unit 30 can calculate the change amount of the outer pressure Pout without the need to prepare the flow rate database or the differential pressure database that are described above. This method is described below.

First, the pressure change measuring apparatus 1 and a separately provided absolute pressure sensor (actually-measured value acquisition unit) are provided to an apparatus to be subjected to vertical motion (vertically moving apparatus). It is preferred that the vertically moving apparatus be an apparatus subjected to the vertical motion at a fixed speed for a long time (vertical motion cycle period), the vertical motion exhibiting as large a difference of elevation as possible. It is assumed here that an elevator is used as the vertically moving apparatus and is caused to reciprocate between the first floor and the sixth floor. In this case, the output of the absolute pressure sensor is shown in FIG. 12, and the output signal of the displacement measuring unit 5 of the differential pressure measuring cantilever 4 is shown in FIG. 13.

Figure 12:
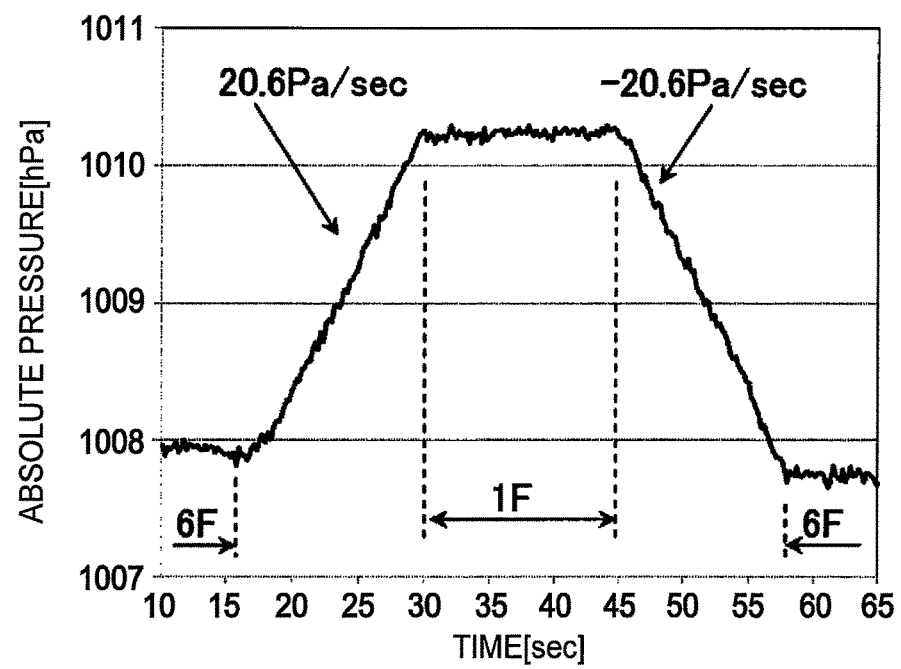
FIG. 12 is an explanatory diagram for showing an output signal of an absolute pressure sensor used for a method of obtaining a coefficient required for the pressure change measuring apparatus according to the first embodiment of the present invention.
Figure 13:
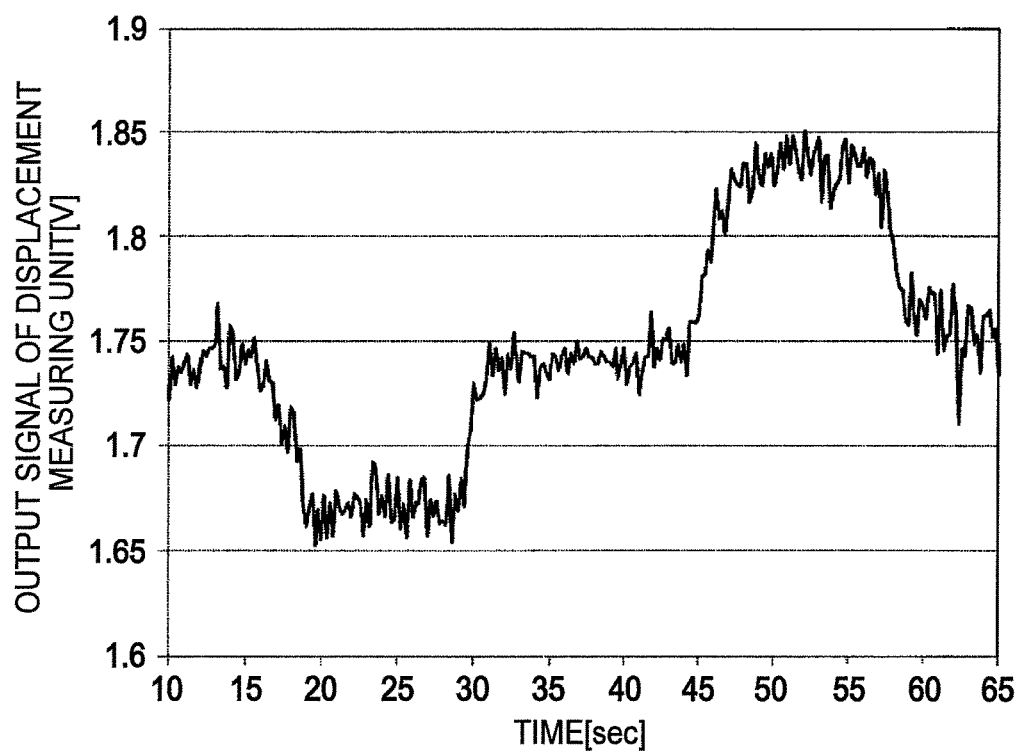
FIG. 13 is an explanatory diagram for showing an output signal of a displacement measuring unit used for a method of obtaining a coefficient required for the pressure change measuring apparatus according to the first embodiment of the present invention.

The arithmetic processing unit 30 calculates in advance temporary sensitivities during a rise in the atmospheric pressure and a drop in the atmospheric pressure from a gradient of an atmospheric pressure change of FIG. 12 obtained by the absolute pressure sensor and the output signal of the displacement measuring unit 5 of the differential pressure measuring cantilever 4. The absolute pressure sensor exhibits 20.6 Pa/sec during both the rise and the drop in the atmospheric pressure, and the temporary sensitivities are −3.4 mV/Pa/sec during the rise in the atmospheric pressure and −4.9 mV/Pa/sec during the drop in the atmospheric pressure.

Further, the arithmetic processing unit 30 assumes an air flow rate of the air flowing into the cavity due to the differential pressure. It is assumed here that the air flow rate is $9.5 \times 10^{-12}$ m$^3$/Pa·sec.

Figure 14:
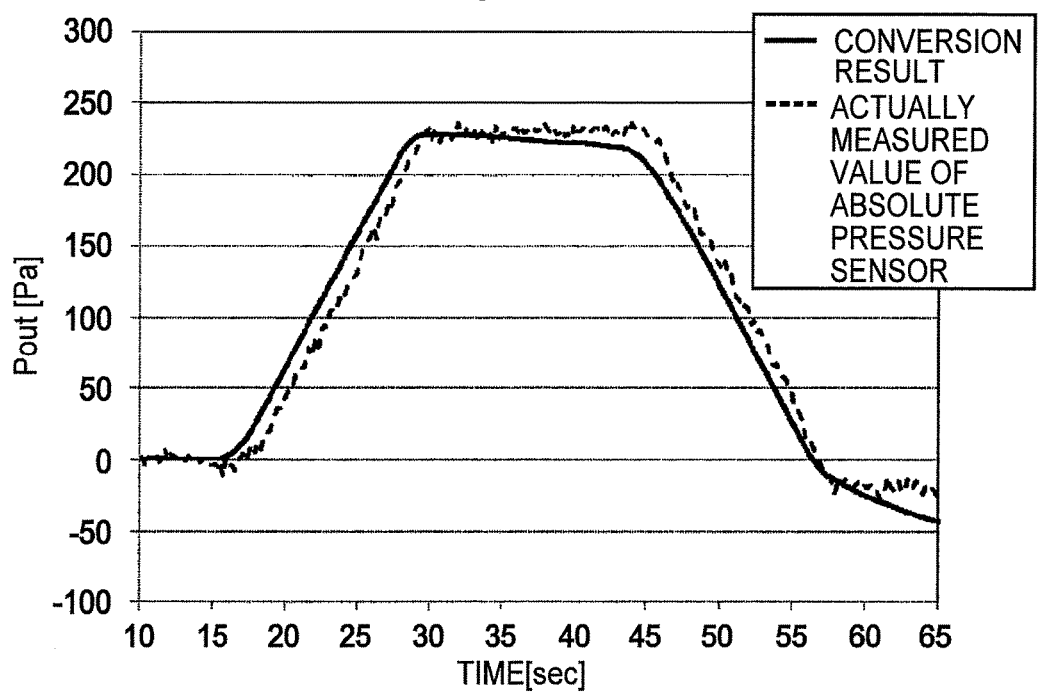
FIG. 14 is an explanatory diagram for showing a result obtained by converting the output signal of FIG. 13 with a temporary numerical value.

Then, the arithmetic processing unit 30 converts the output signal of the displacement measuring unit 5 into a change amount of the atmospheric pressure based on the temporary air flow rate (temporary flowing quantity) and the temporary sensitivity. At this time, the temporary air flow rate and the temporary sensitivity are used instead of the database used in the flow of the processing of FIG. 7. A result of the conversion is shown in FIG. 14. In FIG. 14, the solid line indicates a result of calculating the atmospheric pressure (assumed value of a pressure to be measured) based on the above-mentioned temporary air flow rate and the temporary sensitivity that are described above, and the broken line indicates an actually measured value of the atmospheric pressure obtained by the absolute pressure sensor.

Figure 15:
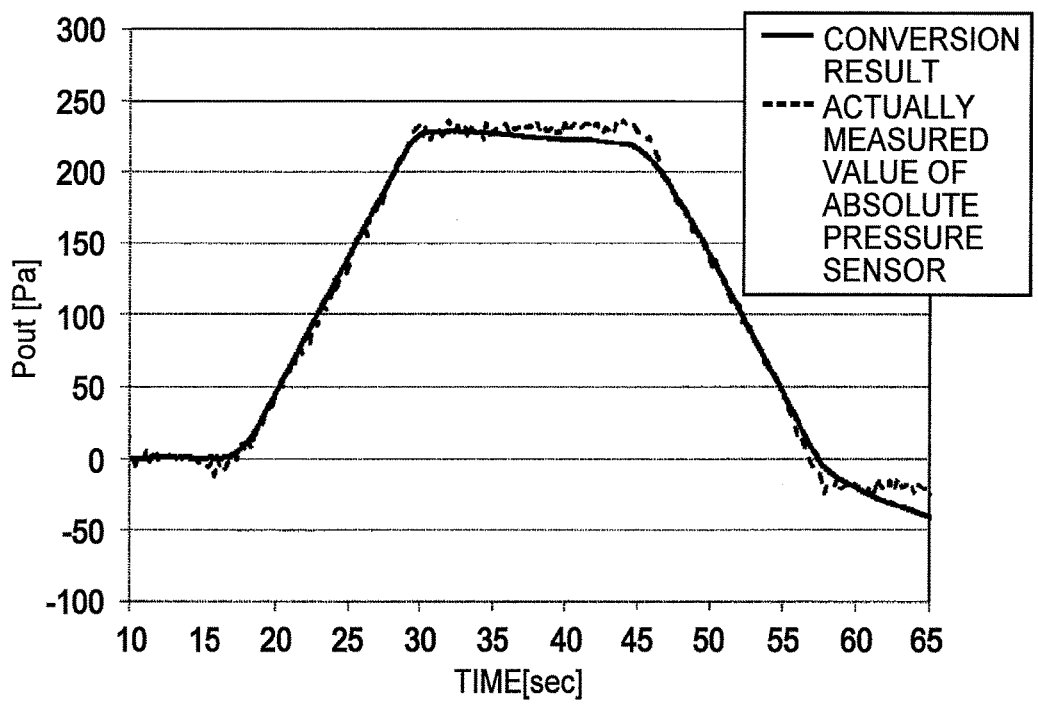
FIG. 15 is an explanatory diagram for showing a result obtained by converting the output signal of FIG. 13 with a determined numerical value.

As can be grasped from FIG. 14, it is understood that tendencies of both are similar, but a time difference occurs when there is a change in the atmospheric pressure, and the temporary air flow rate and the temporary sensitivity do not match the actual ones. In this case, the numerical value similar to the output of the absolute pressure sensor is obtained through the changing of numerical values of the air flow rate and the sensitivity while a ratio between the sensitivity during the rise in the atmospheric pressure and the sensitivity during the drop in the atmospheric pressure is fixed. A result of converting the change amount of the atmospheric pressure with the air flow rate of $2.75 \times 10^{-11}$ m$^3$/Pa·sec and the sensor sensitivities of −10 mV/Pa/sec during the rise in the atmospheric pressure and −14.4 mV/Pa/sec during the drop in the atmospheric pressure is shown in FIG. 15. In FIG. 15, the solid line indicates a result of calculating the atmospheric pressure based on the temporary air flow rate and the temporary sensitivity that are described above, and the broken line indicates the actually measured value of the atmospheric pressure obtained by the absolute pressure sensor. In this case, as grasped from FIG. 15, the time difference therebetween during the change in the atmospheric pressure becomes much smaller than the time difference of FIG. 14.

As described above, the time difference is small when there is a change in the atmospheric pressure, and the change amount of the atmospheric pressure is also extremely smaller than in the case of the absolute pressure sensor, which enables the arithmetic processing unit 30 to convert the change amount of the atmospheric pressure through the use of the sensor sensitivity and the air flow rate, which are described above, without the need to use the database. Further, the arithmetic processing unit 30 conducts the conversion by creating an extremely large change in the atmospheric pressure, and therefore can reduce an error to be caused when the change in the atmospheric pressure is small. This is because the error decreases in proportion to a change width of the change in the atmospheric pressure. As described above, without the need to measure a complicated database, it is possible to obtain a coefficient required for the arithmetic processing unit 30 and to convert the change amount of the atmospheric pressure.

(Second Embodiment)

Figure 16:
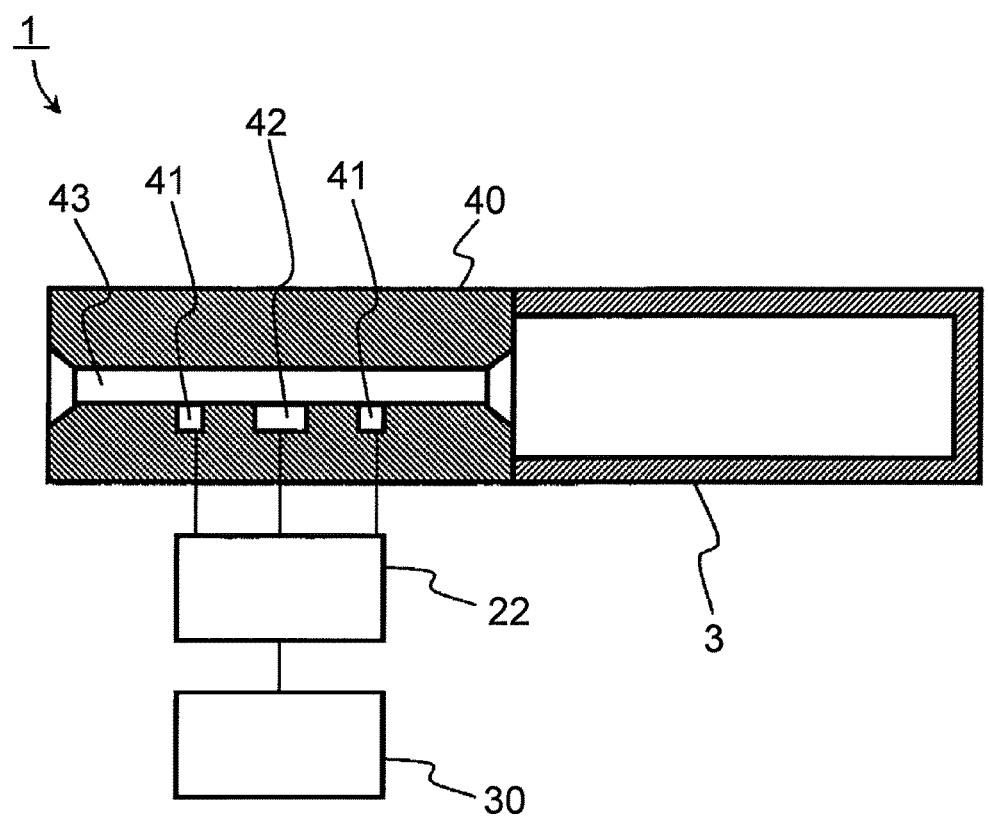
FIG. 16 is a diagram for illustrating a configuration of a pressure change measuring apparatus according to a second embodiment of the present invention.

FIG. 16 is an illustration of a configuration of the pressure change measuring apparatus 1 according to a second embodiment of the present invention. The same components of the pressure change measuring apparatus 1 according to this embodiment as those of the pressure change measuring apparatus 1 according to the first embodiment are denoted by like names and like reference symbols, and descriptions thereof are omitted.

The pressure change measuring apparatus 1 according to the second embodiment is different from the pressure change measuring apparatus according to the first embodiment in that the differential pressure measuring cantilever 4 is replaced by a thermal type differential pressure gauge 40 illustrated in FIG. 16.

The pressure change measuring apparatus 1 illustrated in FIG. 16 includes the thermal type differential pressure gauge 40, the cavity casing 3 provided on one end of the thermal type differential pressure gauge 40, and the arithmetic processing unit 30 connected to the detection circuit 22 of the thermal type differential pressure gauge 40.

The thermal type differential pressure gauge 40 generally includes a pair of temperature sensors 41 provided inside a fine flow channel 43 and a heater 42 (heat source) arranged in a position with equal distances from the respective temperature sensors 41, and is formed of a passage shape in which the communication hole communicates to/from an opening portion of the cavity casing 3. In the thermal type differential pressure gauge 40, when the heater 42 is generating heat, the pressure transmission medium inside the flow channel 43 is overheated. When the pressure transmission medium is stopped in the thermal type differential pressure gauge 40, heat is spread around the heater 42, and a temperature distribution having a bilateral symmetry is obtained inside the flow channel 43. In this case, the same output value is obtained from the respective temperature sensors 41.

When the differential pressure occurs on both ends of the flow channel 43, the pressure transmission medium flows from one end of the flow channel 43 on the high-pressure side to the other end of the flow channel 43 on the low-pressure side. The temperature distribution inside the flow channel 43 exhibited at this time is biased toward a downstream side, and hence the temperature becomes lower on an upstream side and becomes higher on the downstream side.

Therefore, the output value of the temperature sensor 41 on the downstream side becomes larger. Hence, in the thermal type differential pressure gauge 40, a flow velocity of the pressure transmission medium is obtained from a difference between the output values of the temperature sensor 41 on the upstream side and the downstream side at this time, and hence the differential pressure between both ends of the flow channel 43 can be detected from the flow velocity.

Therefore, in the pressure change measuring apparatus 1 including the thermal type differential pressure gauge 40, the arithmetic processing unit 30 can measure the change amount of the outer pressure Pout through use of the output signal obtained from the detection circuit 22 of the thermal type differential pressure gauge 40 and the flow rate database and the differential pressure database that represent basic characteristics of the thermal type differential pressure gauge 40.

Compared with a cantilever type differential pressure gauge, the above-mentioned thermal type differential pressure gauge 40 has a wider range in which the differential pressure applied to both ends of a flow channel and the flow rate of the pressure transmission medium exhibit a proportional relationship, which relatively facilitates the conversion into the pressure change amount.

(Calculation Flow for Change Amount of Outer Pressure)

Figure 17:
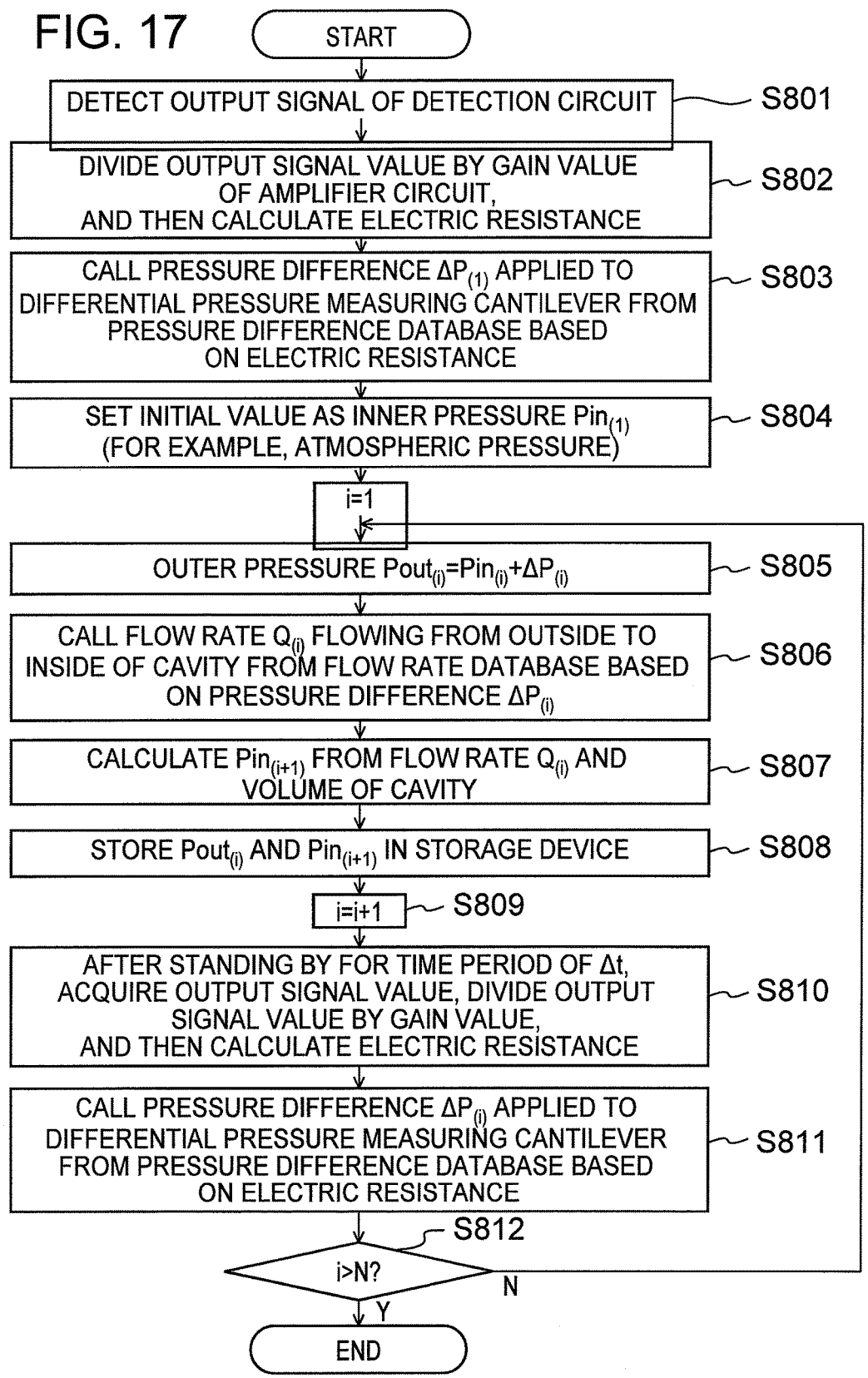
FIG. 17 is a flowchart for illustrating a flow of processing of the arithmetic processing unit included in the pressure change measuring apparatus according to the second embodiment of the present invention.

Next, a calculation flow for the change amount of the outer pressure implemented by the arithmetic processing unit 30 of the pressure change measuring apparatus 1 according to the second embodiment is described with reference to FIG. 17. In this case, the arithmetic operation processing is conducted substantially simultaneously with the output signal obtained from a detection circuit, to thereby be able to obtain the outer pressure Pout with a time difference close to real time.

First, the arithmetic processing unit 30 acquires a value of the output signal of the detection circuit 22 (Step S801).

Subsequently, the arithmetic processing unit 30 divides the value of the output signal of the detection circuit 22 acquired in Step S801 by the amplification factor (gain value) of the amplifier circuit 22a included in the detection circuit 22, to thereby calculate the voltage value output from the bridge circuit. Subsequently, the arithmetic processing unit 30 calculates the electric resistance of the piezoresistors 20 from the resistance values of the resistor elements included in the bridge circuit and the voltage supplied to the bridge circuit (Step S802).

Subsequently, the arithmetic processing unit 30 calls the differential pressure $\Delta P(1)$ applied to the differential pressure measuring cantilever from the differential pressure database based on the electric resistance of the piezoresistors 20 (Step S803).

Then, the arithmetic processing unit 30 sets the initial value as the first inner pressure Pin(1) at the earliest time among the inner pressures Pin(i) (i=1 to N; N represents a natural number equal to or larger than 2) (Step S804). The inner pressure Pin(1) is set to the atmospheric pressure on the assumption that the apparatus is used in the air.

Subsequently, the arithmetic processing unit 30 adds the differential pressure $\Delta P(i)$ to Pin(i) to calculate the outer pressure Pout (i) (Step S805).

Subsequently, the arithmetic processing unit 30 reads the flow rate Q(i) of the pressure transmission medium (air in this case) flowing into the cavity 10 from the flow rate database based on the differential pressure $\Delta P(i)$ calculated in Step S805 (Step S806).

Subsequently, the arithmetic processing unit 30 calculates Pin(i+1) after the time period of $\Delta t$ from the flow rate Q(i) and the volume V of the cavity based on Expression (2) (Step S807).

Subsequently, the arithmetic processing unit 30 stores Pin(i+1) obtained in Step S807 and Pout(i) calculated in Step S805 in the storage device (Step S808).

Subsequently, the arithmetic processing unit 30 substitutes i+1 into i (Step S809), and after standing by for the time period of $\Delta t$, acquires the output signal of the detection circuit 22, and divides the output signal by the gain value, to thereby calculate the electric resistance of the piezoresistors (Step S810). Subsequently, the arithmetic processing unit 30 calls the differential pressure $\Delta P(i)$ applied to the differential pressure measuring cantilever from the differential pressure database based on the electric resistance calculated in Step S810 (Step S811).

Subsequently, the arithmetic processing unit 30 determines whether or not i exceeds N (Step S812). When determining that i is equal to or smaller than N (Step S812; N), in short, during a measurement period of $\Delta t \times N$, the arithmetic processing unit 30 repeatedly conducts the processing of Steps S805 to S811 (Step S812). When determining that i exceeds N (Step S812; Y), the arithmetic processing unit 30 brings the processing to an end. This allows the arithmetic processing unit 30 to accumulate the N outer pressures Pout for every time period of $\Delta t$ within the storage device. This information indicates how the outer pressure Pout has changed during the period of $N \times \Delta t$.

With the above-mentioned configuration, the arithmetic processing unit 30 can measure the temporal detail of the outer pressure Pout, that is, the change amount of the outer pressure Pout, which cannot be easily obtained from the output signal of the detection circuit 22.

(Third Embodiment)

A description is made of the pressure change measuring apparatus 1 according to a third embodiment of the present invention. The same components as those of the pressure change measuring apparatus 1 according to the first and second embodiments described above are denoted by like names and like reference symbols, and descriptions thereof are omitted.

The pressure change measuring apparatus 1 according to the third embodiment has the same configuration as that of the pressure change measuring apparatus 1 according to the first embodiment. However, the pressure change measuring apparatus 1 according to this embodiment is different from the pressure change measuring apparatus 1 according to the first embodiment in that processing of the arithmetic processing unit 30 is conducted in consideration of a dynamic characteristic of the differential pressure measuring cantilever 4, in particular, damping. That is, the first embodiment is described by taking the case where the differential pressure measuring cantilever 4 is deformed in proportion to the differential pressure applied to the differential pressure measuring cantilever 4 without a time delay, but the arithmetic processing unit 30 according to this embodiment conducts effective processing when the differential pressure applied to the differential pressure measuring cantilever 4 changes extremely quickly and when the deformation of the differential pressure measuring cantilever 4 causes a time delay from the differential pressure.

(Calculation Flow for Change Amount of Outer Pressure)

Figure 18:
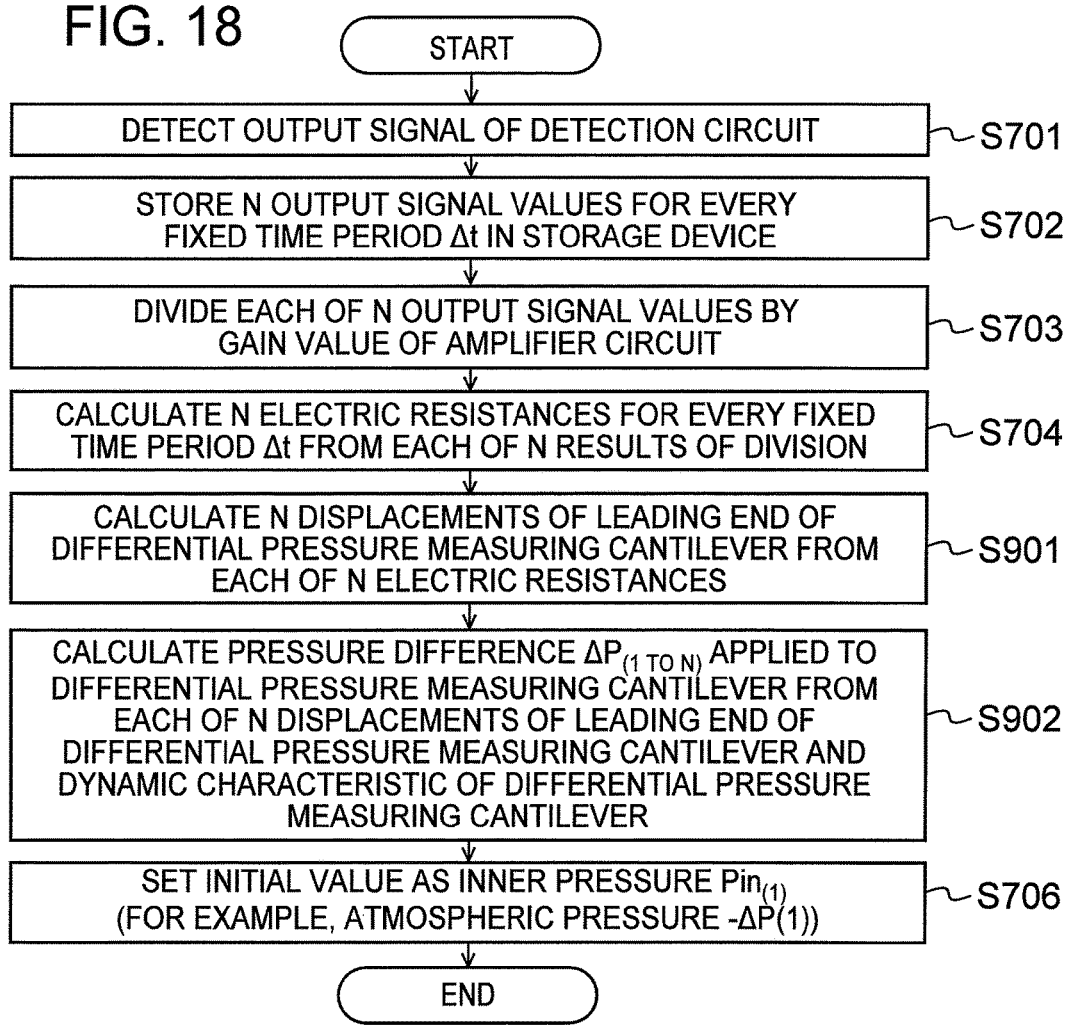
FIG. 18 is a flowchart for illustrating a flow of processing of the arithmetic processing unit included in a pressure change measuring apparatus according to the third embodiment of the present invention.

A calculation flow for the change amount of the outer pressure implemented by the arithmetic processing unit 30 of the pressure change measuring apparatus 1 according to the third embodiment is described with reference to a flowchart of FIG. 18.

First, the processing from the storing of the output signal of the detection circuit 22 in the storage device to the calculating of the electric resistances is the same as the processing of the arithmetic processing unit 30 according to the first embodiment (Steps S701 to S704).

Figure 19:
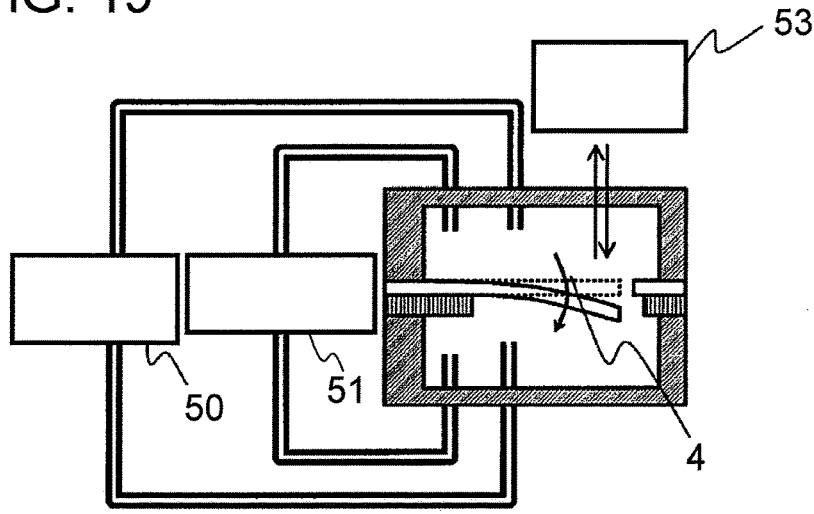
FIG. 19 is an explanatory diagram for illustrating a configuration for measuring a characteristic of the differential pressure measuring cantilever included in the pressure change measuring apparatus according to the third embodiment of the present invention.
Figures 20, 21, 22:
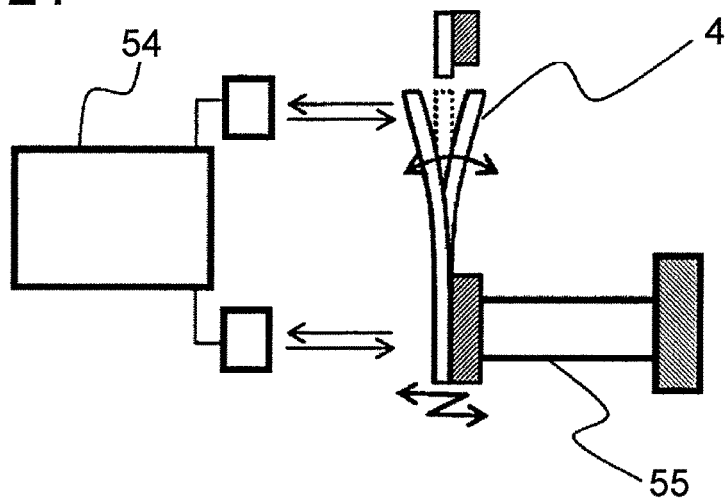
FIG. 20 is an explanatory diagram for showing a relationship between a deformation amount of a cantilever and a rate of change in the electric resistance regarding the differential pressure measuring cantilever included in the pressure change measuring apparatus according to the third embodiment of the present invention.
FIG. 21 is an explanatory diagram for illustrating a configuration for measuring a characteristic of the differential pressure measuring cantilever included in the pressure change measuring apparatus according to the third embodiment of the present invention.
FIG. 22 is an explanatory diagram for showing a dynamic characteristic of the cantilever regarding the differential pressure measuring cantilever included in the pressure change measuring apparatus according to the third embodiment of the present invention.

In this case, the arithmetic processing unit 30 calculates N displacements of a leading end of the differential pressure measuring cantilever 4 from the N electric resistances obtained in Step S704 (S901). That is, the arithmetic processing unit 30 calculates the stress of the piezoresistors 20 from the acquired electric resistance, to thereby be able to calculate the displacement of the leading end of the differential pressure measuring cantilever 4. The arithmetic processing unit 30 may use an optical displacement meter 53 (for example, laser displacement meter) as illustrated in FIG. 19 to measure a relationship between the displacement amount of the leading end of the differential pressure measuring cantilever 4 and the electric resistance, and may create a database that stores in advance a deformation amount of the cantilever for each rate of change resistance ΔR/R as shown in FIG. 20.

Subsequently, the arithmetic processing unit 30 obtains the differential pressure ΔP applied to the cantilever in actuality based on the displacement amount of the leading end of the differential pressure measuring cantilever 4 calculated in Step S901 and the dynamic characteristic of the differential pressure measuring cantilever 4 (S902). In this case, as illustrated in FIG. 21, the differential pressure measuring cantilever is excited in advance, and a laser Doppler vibrometer 54 or the like is used to measure a frequency in the vicinity of a resonance frequency and the displacement amount of the leading end of the cantilever 4. A measurement result shown in FIG. 22 can be used to model the differential pressure measuring cantilever 4 as a mass spring damper of one degree of freedom. It is possible to obtain a transfer function for obtaining the displacement for a case where an external force is applied to the above-mentioned model. The inverse function of the transfer function is calculated, and a numerical expression for obtaining the external force from the displacement is obtained, to thereby be able to obtain the applied differential pressure ΔP from the displacement of the leading end of the differential pressure measuring cantilever 4.

Subsequently, the initial value is set as the inner pressure Pin(1) (S706). In this case, the atmospheric pressure −ΔP(1) is set. As the subsequent processing, the same processing as the processing of the first embodiment is conducted.

With this configuration, even when the differential pressure ΔP applied to the differential pressure measuring cantilever 4 changes extremely quickly, it is possible to correct the time delay from the differential pressure ΔP, which is caused by the deformation of the differential pressure measuring cantilever 4, and it is possible to detect the change amount of the outer pressure more accurately from the output signal of the detection circuit 22.

REFERENCE SIGNS LIST

1 pressure change measuring apparatus
2 SOI substrate
3 cavity casing
4 differential pressure measuring cantilever (cantilever)
5 displacement measuring unit
10 cavity
12 lid
13 gap
15 through hole
20 piezoresistor
22 detection circuit
30 arithmetic processing unit (differential pressure calculation unit, pressure-to-be-measured calculating unit, flow rate calculating unit, inner pressure updating unit)
40 thermal type differential pressure gauge
41 temperature sensor
42 heater
43 flow channel
50 pump
51 micro differential pressure gauge
52 flowmeter (mass flowmeter)
53 optical displacement meter (laser displacement meter)
54 laser Doppler vibrometer

The invention claimed is:

1. A pressure change measuring apparatus for detecting a time variation of a pressure to be measured, comprising:
   a differential pressure sensor comprising:
      a cavity casing defining a cavity having a predetermined volume and a communication hole configured to allow a pressure transmission medium for transmitting the pressure to be measured to flow into and out of the cavity,
      a cantilever which is provided on the cavity casing to block an opening surface of the cavity other than the communication hole and which is configured to bend to be deformed depending on the pressure difference between the inner pressure of the cavity and the pressure to be measured, and
      a displacement measuring unit configured to measure a displacement corresponding to the bending deformation of the cantilever and output an output signal relating to a differential pressure between an inner pressure of the cavity, and the pressure to be measured; and
   an arithmetic processing unit configured to calculate the time variation of the pressure to be measured,
   wherein the arithmetic processing unit comprises:
      a differential pressure calculation unit configured to obtain the pressure difference between the inner pressure of the cavity and the pressure to be measured based on the output signal of the displacement measurement unit;

a pressure-to-be-measured calculating unit configured to calculate the pressure to be measured based on a set inner pressure of the cavity and the pressure difference calculated by the differential pressure calculation unit;

a flow rate calculating unit configured to calculate a flowing quantity of the pressure transmission medium flowing into and out of the cavity for every unit of a predetermined time period based on the pressure difference calculated by the differential pressure calculation unit; and an inner pressure updating unit configured to calculate the inner pressure of the cavity after the predetermined time period based on the flowing quantity calculated by the flow rate calculating unit and the predetermined volume of the cavity, and to update, to the calculated inner pressure, a set value of the inner pressure of the cavity to be used by the pressure-to-be-measured calculating unit.

2. A pressure change measuring apparatus according to claim 1, wherein:

the arithmetic processing unit further comprises a flow rate database unit configured to store in advance the flowing quantity of the pressure transmission medium corresponding to a level of the pressure difference between the inner pressure of the cavity and the pressure to be measured; and the flow rate calculating unit is configured to extract, from the flow rate database unit, the flowing quantity of the pressure transmission medium corresponding to the pressure difference calculated by the differential pressure calculation unit.

3. A pressure change measuring apparatus according to claim 2, wherein the flow rate database unit is generated by obtaining a relationship between a pressure difference between both ends of the communication hole and the flowing quantity of the pressure transmission medium for every unit of the predetermined time period in advance through a numerical calculation, and by calculating the flowing quantity of the pressure transmission medium moving into and out of the cavity for every unit of the predetermined time period based on the relationship and the pressure difference calculated by the differential pressure calculation unit.

4. A pressure change measuring apparatus according to claim 1, further comprising an actually-measured value acquisition unit configured to acquire an actually measured value of the pressure to be measured, wherein the flow rate calculating unit is configured to:

calculate an assumed value of the pressure to be measured through use of a temporary flowing quantity of the pressure transmission medium flowing into and out of the cavity for every unit of the predetermined time period from the output signal of the differential pressure sensor;

change the temporary flowing quantity until an error between the assumed value and the actually measured value of the pressure to be measured, which is acquired from the actually-measured value acquisition unit, becomes equal to or smaller than a predetermined value; and calculate, as the flowing quantity, the temporary flowing quantity at a time point when the error becomes equal to or smaller than the predetermined value.

5. A pressure change measuring apparatus for detecting a time variation of a pressure to be measured, comprising:

a differential pressure sensor comprising:

a cavity casing defining a cavity having a predetermined volume and a communication hole configured to allow a pressure transmission medium for transmitting the pressure to be measured to flow into and out of the cavity, a passage through which the communication hole communicates to/from an opening portion of the cavity, a heat source arranged inside the communication hole, a pair of temperature sensors arranged across the heat source at equal intervals, and a differential pressure measuring unit configured to measure a pressure difference between both ends of the communication hole based on output signals of the pair of temperature sensors and output an output signal relating to a differential pressure between an inner pressure of the cavity, and the pressure to be measured; and an arithmetic processing unit configured to calculate the time variation of the pressure to be measured, wherein the arithmetic processing unit comprises:

a differential pressure calculation unit configured to obtain the pressure difference between the inner pressure of the cavity and the pressure to be measured based on the output signal of the differential pressure measuring unit;

a pressure-to-be-measured calculating unit configured to calculate the pressure to be measured based on a set inner pressure of the cavity and the pressure difference calculated by the differential pressure calculation unit;

a flow rate calculating unit configured to calculate a flowing quantity of the pressure transmission medium flowing into and out of the cavity for every unit of a predetermined time period based on the pressure difference calculated by the differential pressure calculation unit; and an inner pressure updating unit configured to calculate the inner pressure of the cavity after the predetermined time period based on the flowing quantity calculated by the flow rate calculating unit and the predetermined volume of the cavity, and to update, to the calculated inner pressure, a set value of the inner pressure of the cavity to be used by the pressure-to-be-measured calculating unit.

6. A pressure change measuring method for detecting a time variation of a pressure to be measured by a pressure change measuring apparatus comprising a differential pressure sensor, which has a cavity casing defining a cavity having a predetermined volume and a communication hole configured to allow a pressure transmission medium for transmitting the pressure to be measured to flow into and out of the cavity, a cantilever which is provided on the cavity casing to block an opening surface of the cavity other than the communication hole and which is configured to bend to be deformed depending on the pressure difference between the inner pressure of the cavity and the pressure to be measured, and a displacement measuring unit configured to measure a displacement corresponding to the bending deformation of the cantilever and output an output signal relating to a pressure difference between an inner pressure of the cavity and the pressure to be measured, the pressure change measuring method comprising:

a differential pressure calculating step of obtaining the pressure difference between the inner pressure of the cavity and the pressure to be measured based on the output signal of the displacement measuring unit;

a pressure-to-be-measured calculating step of calculating the pressure to be measured based on a set inner pressure of the cavity and the pressure difference calculated in the differential pressure calculating step;

a flow rate calculating step of calculating a flowing quantity of the pressure transmission medium flowing into and out of the cavity for every unit of a predetermined time period based on the pressure difference calculated in the differential pressure calculating step; and an inner pressure updating step of calculating the inner pressure of the cavity after the predetermined time period based on the flowing quantity calculated in the flow rate calculating step and the predetermined volume of the cavity, and updating, to the calculated inner pressure, a set value of the inner pressure of the cavity to be used in the pressure-to-be-measured calculating step.

7. A pressure change measuring method according to claim 6, further comprising an iterative processing step of repeatedly executing at least the pressure-to-be-measured calculating step, the flow rate calculating step, and the inner pressure updating step.

8. A pressure change measuring method according to claim 7, wherein the iterative processing step is executed for every set predetermined time period after setting of the predetermined time period.

9. A pressure change measuring method according to claim 8, wherein the differential pressure calculating step comprises:

receiving the output signal of the differential pressure sensor for every predetermined time period;

storing each output signal of the differential pressure sensor that has been received in a storage device included in the pressure change measuring apparatus; and obtaining the pressure difference for every predetermined time period based on the stored output signal of the differential pressure sensor.

10. A pressure change measuring method according to claim 8, wherein the pressure-to-be-measured calculating step comprises setting an initial value as the inner pressure of the cavity during a first iteration of the iterative processing step.

11. A pressure change measuring method according to claim 10, wherein the initial value of the inner pressure of the cavity comprises an absolute pressure value of the pressure to be measured.

12. A pressure change measuring method according to claim 11, wherein the initial value of the inner pressure of the cavity comprises a value obtained by subtracting, from the absolute pressure value of the pressure to be measured, a value of the pressure difference obtained in the differential pressure calculating step.

* * * * *